United States Patent
Fujii et al.

(10) Patent No.: US 9,355,324 B2
(45) Date of Patent: May 31, 2016

(54) IMAGE PROCESSING APPARATUS AND IMAGE PROCESSING METHOD

(71) Applicant: FUJITSU LIMITED, Kawasaki-shi, Kanagawa (JP)

(72) Inventors: Yusaku Fujii, Shinagawa (JP); Yoshinobu Hotta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 13/910,382

(22) Filed: Jun. 5, 2013

(65) Prior Publication Data
US 2013/0336601 A1 Dec. 19, 2013

(30) Foreign Application Priority Data
Jun. 13, 2012 (JP) ................. 2012-134077

(51) Int. Cl.
*G06K 9/32* (2006.01)
*G06T 3/40* (2006.01)

(52) U.S. Cl.
CPC ............... *G06K 9/32* (2013.01); *G06T 3/4038* (2013.01)

(58) Field of Classification Search
None
See application file for complete search history.

(56) References Cited

U.S. PATENT DOCUMENTS

| | | | | |
|---|---|---|---|---|
| 5,452,105 A | * | 9/1995 | Tamagaki et al. | 358/453 |
| 2005/0180649 A1 | * | 8/2005 | Curry et al. | 382/243 |
| 2005/0196070 A1 | * | 9/2005 | Takakura et al. | 382/284 |
| 2006/0110073 A1 | * | 5/2006 | Matsushita et al. | 382/305 |
| 2010/0296137 A1 | * | 11/2010 | Zahnert et al. | 358/488 |
| 2013/0208997 A1 | * | 8/2013 | Liu | G06T 3/20 382/284 |
| 2014/0320565 A1 | * | 10/2014 | Iton et al. | 347/19 |
| 2015/0154776 A1 | * | 6/2015 | Zhang | G06T 11/60 382/284 |

FOREIGN PATENT DOCUMENTS

| | | | | |
|---|---|---|---|---|
| GB | 2477116 A | * | 7/2011 | ......... G06K 9/4652 |
| JP | 7-23204 | | 1/1995 | |
| JP | 8-204945 | | 8/1996 | |
| JP | 2010-141558 A | | 6/2010 | |
| JP | 2011-91638 A | | 5/2011 | |
| JP | 2012-109737 A | | 6/2012 | |

OTHER PUBLICATIONS

Office Action issued Dec. 1, 2015 in Japanese Patent Application No. 2012-134077 (with English language translation).

* cited by examiner

*Primary Examiner* — Stephen R Koziol
*Assistant Examiner* — Pinalben Patel
(74) *Attorney, Agent, or Firm* — Oblon, McClelland, Maier & Neustadt, L.L.P.

(57) ABSTRACT

An image processing apparatus, includes: a processor coupled to a memory, configured to: detect corresponding relationships between lines of two or more pairs in a pair of images each having different local deformation, correct the local deformation of each of the pair of images, based on the corresponding relationships between the lines of the two or more pairs in the pair of images, and concatenate the pair of images in which the local deformation is corrected into a single image.

20 Claims, 26 Drawing Sheets

FEATURE ON ONE PIXEL ON RIGHT
SIDE IN LEFT IMAGE

FEATURE ON ONE PIXEL ON LEFT SIDE
IN RIGHT IMAGE

FIG. 7A

| $X_{ij}$ | b1 | b2 | b3 | ... |
|---|---|---|---|---|
| a1 | 5 | 15 | 31 | |
| a2 | 10 | 20 | 10 | |
| a3 | 21 | 10 | 20 | |
| ... | | | | |

VALUE OF $X_{ij} = |a_i - b_j|$

FIG. 7B

| $C_{ij}$ | | j=1 | j=2 | j=3 | ... |
|---|---|---|---|---|---|
| | 0 | ∞ | ∞ | ∞ | |
| i=1 | ∞ | 10 | 20 | ∞ | |
| i=2 | ∞ | 15 | 50 | 40 | |
| i=3 | ∞ | ∞ | 35 | 45 | |
| ... | | | | | |

VALUE OF $C_{ij}$

FIG. 7C

| PATH | | j=1 | j=2 | j=3 | ... |
|---|---|---|---|---|---|
| | | | | | |
| i=1 | | | (2) | (3) | |
| i=2 | | (1) | (2) | (2) | |
| i=3 | | | (2) | (3) | |
| ... | | | | | |

(1) $C_{i-2,j-1} + X_{i-1,j} + X_{ij}$
(2) $C_{i-1,j-1} + 2 \times X_{ij}$
(3) $C_{i-1,j-2} + X_{i,j-1} + X_{ij}$

FIG. 9

| LEFT IMAGE LINE | RIGHT IMAGE LINE |
|---|---|
| 1 | 1 |
| 2 | 1 |
| 3 | 2 |
| 3 | 3 |

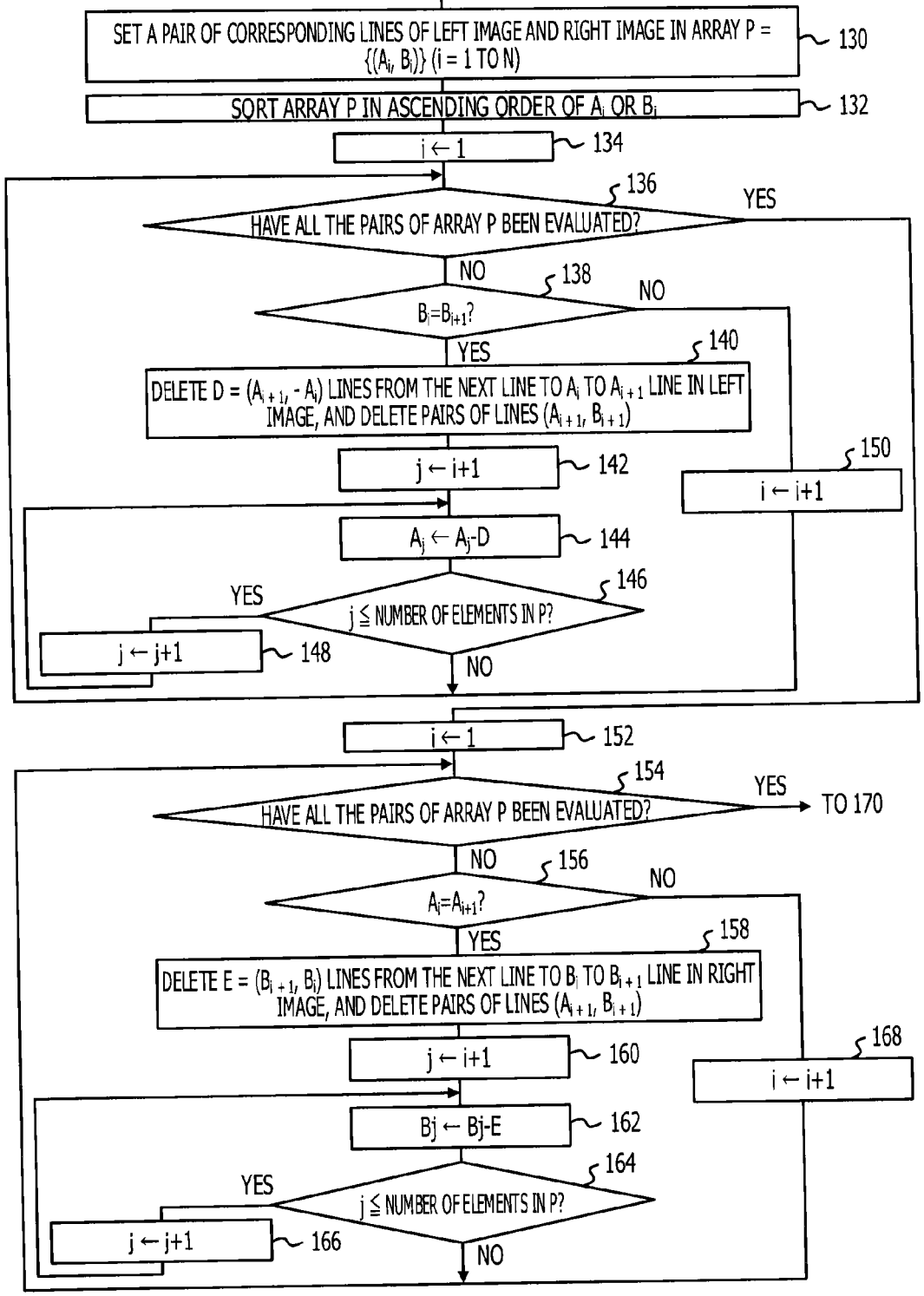

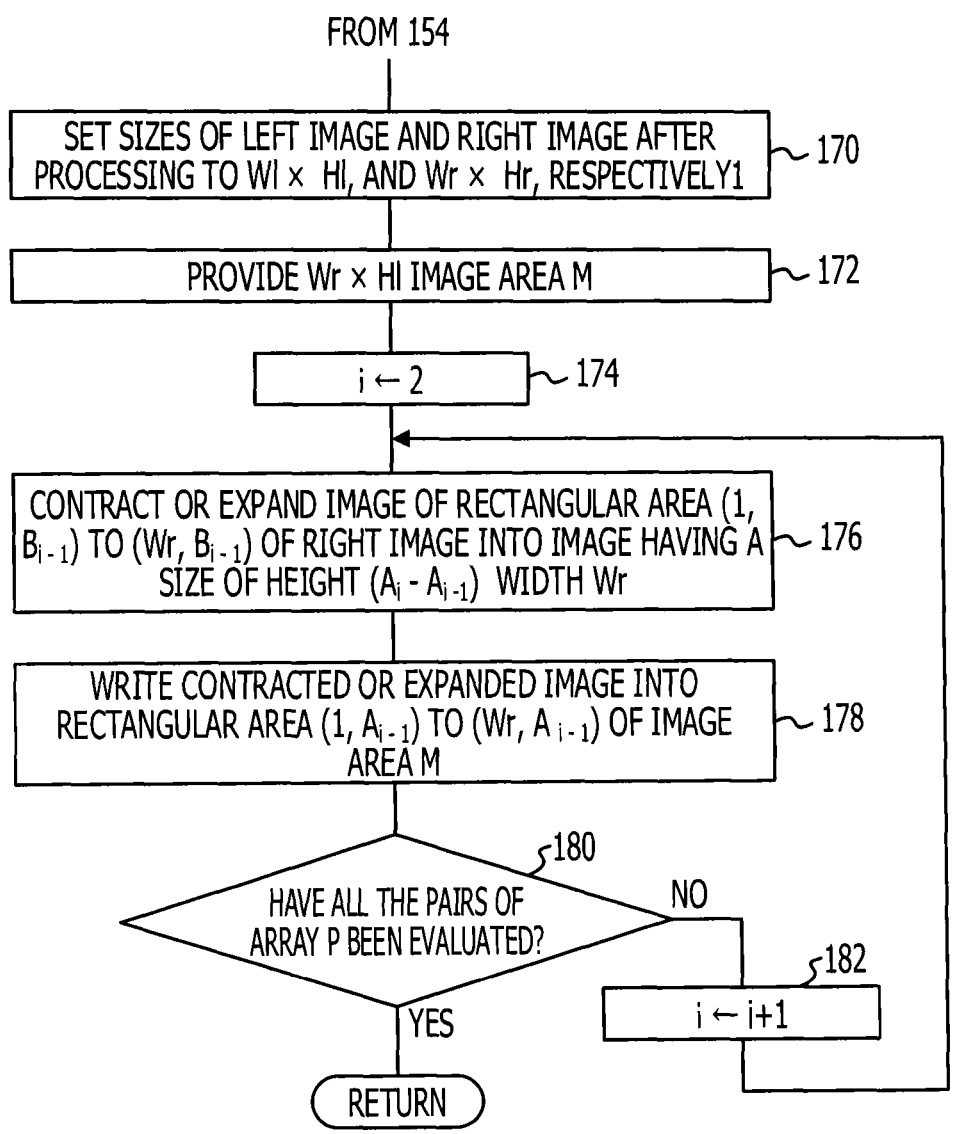

FIG. 16

| LINE NUMBER OF SCANNED IMAGE | AMOUNT OF TRANSPORT OF DETECTED DOCUMENT |
|---|---|
| 0 | 0 |
| 1 | 85 |
| 2 | 169 |
| 3 | 260 |
| 4 | 335 |
| ... | |

FIG. 17

| LINE NUMBER OF SCANNED IMAGE | AMOUNT OF TRANSPORT OF LEFT IMAGE |
|---|---|
| 1 | A1 |
| 2 | A2 |
| 3 | A3 |
| ⋮ | ⋮ |
| i | Ai |

| LINE NUMBER OF SCANNED IMAGE | AMOUNT OF TRANSPORT OF RIGHT IMAGE |
|---|---|
| 1 | B1 |
| 2 | B2 |
| 3 | B3 |
| ⋮ | ⋮ |
| j | Bj |

FIG. 19

| LEFT IMAGE LINE | RIGHT IMAGE LINE |
|---|---|
| 1 | 1 |
| 2 | 2 |
| 3 | 3 |
| 4 | 3 |
| 5 | 3 |
| 6 | 4 |
| 6 | 5 |
| ... | ... |

FIG. 21

| LINE NUMBER OF SCANNED IMAGE | AMOUNT OF TRANSPORT OF DETECTED DOCUMENT |
|---|---|
| 0 | 0 μm |
| 1 | 85 μm |
| 2 | 169 μm |
| 3 | 260 μm |
| 4 | 335 μm |
| ... | ... |

FIG. 23

| LINE NUMBER OF SCANNED IMAGE | IDEAL DOCUMENT TRANSPORT AMOUNT ($\mu$m) |
|---|---|
| 0 | 0 |
| 1 | 84.7 |
| 2 | 169.3 |
| 3 | 254 |
| 4 | 338.7 |
| ... | ... |

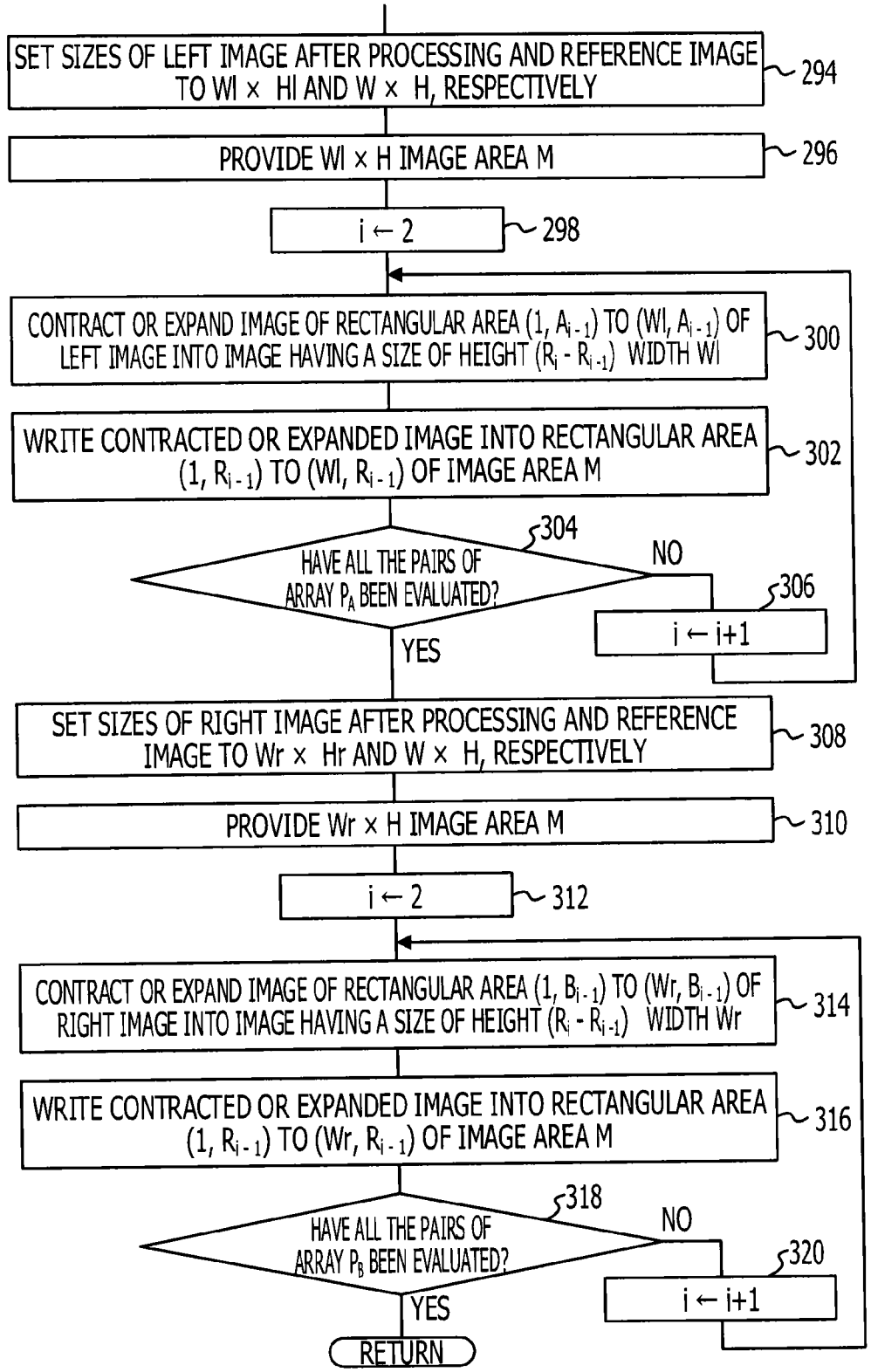

IMAGE PROCESSING APPARATUS AND IMAGE PROCESSING METHOD

CROSS-REFERENCE TO RELATED APPLICATION

This application is based upon and claims the benefit of priority from the prior Japanese Patent Application No. 2012-134077 filed on Jun. 13, 2012, the entire contents of which are incorporated herein by reference.

FIELD

The embodiments discussed herein are related to an image processing apparatus and an image processing method.

BACKGROUND

When a document is read by a scanner, if a size of a document readable by the scanner is smaller than a size of the document to be read, the following reading methods are used. In a first reading method, for example, in the case where a document size readable by the scanner is A4, and a size of the document to be read is A3, the A3-size document is folded in two, is held at a predetermined position using special sheets, then is subjected to double-sided scanning, and scanned images are concatenated. Also, in a second reading method, for example, in the case where a document size readable by the scanner is A4, and a size of the document to be read is A3, the scanner is set to a non-separation-document feed mode, the A3-size document folded in two is subjected to double-sided scanning, and then scanned images are concatenated.

However, in the first reading method and in the second reading method, a user has to fold a document in two, and then manually set the document one by one to be held with the special sheets, or place the document in the scanner. Accordingly, if there is a large volume of document to be read, an auto document feeder (ADF) is not fully utilized, and thus it takes enormous time and effort for manual operation. Accordingly, the following method is considered as a third reading method. In the third reading method, a document is separated into pieces each having a size readable with a scanner (for example, an A4 size, which is a half of an A3 size), the document is scanned using the ADF, and then the read images are reconstructed (concatenated) into an image of the original size. However, in the third reading method, because of fluctuations of document transport speed at reading, or the like, if a plurality of read images are simply concatenated, mismatching may occur at a boundary of images.

In relation to the above, a technique of automatically connecting divided and read images has been proposed. In this technique, line segments that exist in the direction vertical to a boundary direction are extracted, and one of the images is translated and the position thereof is adjusted so that a difference does not arise on the extracted line segments at the boundary of the images.

Also, a technique has been proposed in which for a character and a figure that spread over a first image and a second image, positions of a right image and a left image are adjusted so that matching points become the maximum and a combined image having little misalignment is obtained.

Related-art techniques have been disclosed in Japanese Laid-open Patent Publication Nos. 07-23204 and 08-204945.

SUMMARY

According to an aspect of the embodiments, an image processing apparatus, includes: a processor coupled to a memory, configured to: detect corresponding relationships between lines of two or more pairs in a pair of images each having different local deformation, correct the local deformation of each of the pair of images, based on the corresponding relationships between the lines of the two or more pairs in the pair of images, and concatenate the pair of images in which the local deformation is corrected into a single image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 7A to 7C are explanatory diagrams for explaining calculation of a cost by dynamic programming;

FIG. 9 is a table illustrating an example of a corresponding relationship detected by the corresponding relationship detection processing;

FIGS. 10A and 10B are flowcharts illustrating local expansion and contraction correction processing according to the first embodiment;

FIG. 16 is a table illustrating an example of a detection result of document transport amount for each line;

FIG. 17 is a table illustrating an example of a detection result of the document transport amount for each line of a left image and a right image;

FIG. 19 is a table illustrating an example of a corresponding relationship detected by the corresponding relationship detection processing;

FIG. 21 is a table illustrating an example of a detection result of document transport amount for each line;

FIG. 23 is a table illustrating an example of an ideal document transport amount for each line obtained by calculation; and FIGS. 24A and 24B are flowcharts illustrating local expansion and contraction correction processing according to the third embodiment.

DESCRIPTION OF EMBODIMENTS

Hereinafter, examples of embodiments of the disclosed technique are described in detail with reference to the drawings.

While inventing the present embodiments, observations were made regarding a related art. Such observations include the following, for example.

In the related art, for example, in the above-described first to third reading methods, at the time when concatenating a pair of images, the images are translated upward, downward, rightward, and leftward so that an adjustment is made such that figures are connected smoothly on the boundary of the images. However, images that are obtained by reading a document while the document is being transported have local expansion and contraction (also referred to as local deformation) because of fluctuations of document transport speed, or the like.

In addition, for example, in the above-described third reading method, a pair of images to be concatenated are obtained by reading the document at different times, and thus places and degrees of local expansion and contraction in the pair of images to be concatenated are different from each other. In this manner, when concatenating a plurality of partial images having local expansion and contraction different from each other, it may be difficult to connect the images without misalignment across the entire length of the boundary of the images only by adjusting positions by translation of the images.

According to the embodiments of the present disclosure, it is desirable to suppress occurrence of misalignment across the entire length of a boundary of an image at the time when concatenating a plurality of partial images having local expansion and contraction different from each other.

First Embodiment

Figure 1:
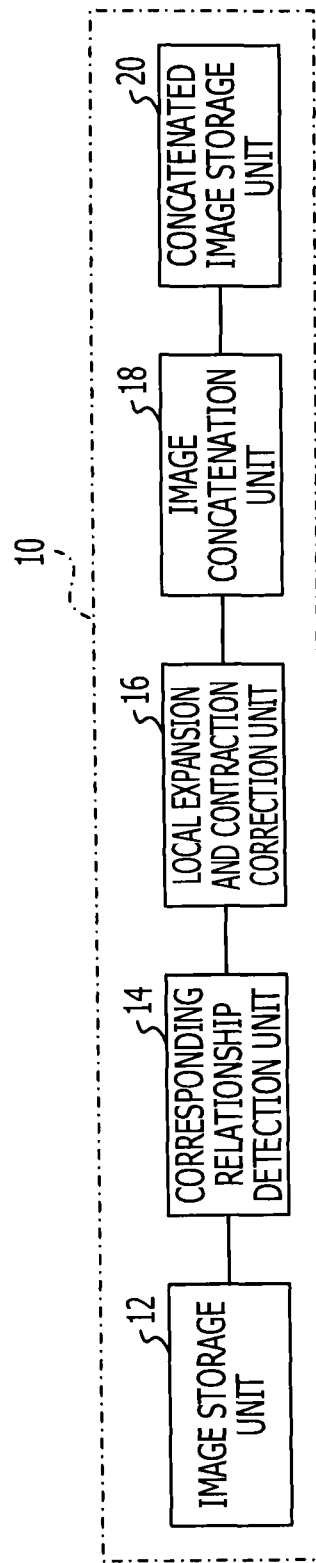
FIG. 1 is a functional block diagram of an image processing apparatus according to a first embodiment.

FIG. 1 illustrates an image processing apparatus 10 according to the first embodiment. The image processing apparatus 10 is an apparatus in which pages of a document are separated into pieces each having a size readable by a scanner, the document parts are separately read by the scanner while being transported, and then a plurality of obtained partial images are subjected to local expansion and contraction (deformation) correction to be concatenated to images of the original size. The image processing apparatus 10 includes an image storage unit 12, a corresponding relationship detection unit 14, a local expansion and contraction correction unit 16, an image concatenation unit 18, and a concatenated image storage unit 20.

The image storage unit 12 obtains image data of a plurality of partial images to be concatenated, which has been obtained by separating each page of the document into a size readable by the scanner, and read by the scanner. The obtained image data of the plurality of partial images to be concatenated is stored. For example, if the document size is A3, and the readable size by the scanner is A4, the document is cut into two A4-size sub-documents along a direction parallel to the short side of the document, and the A4-size sub-documents are transported along a long side to be separately read by the scanner.

Individual images (for example, a left image and a right image) stored in the image storage unit 12 are separately read by the scanner and therefore the images have local expansion and contraction different from each other. The corresponding relationship detection unit 14 performs processing to detect a corresponding relationship between lines in a pair of images to be concatenated, which are stored in the image storage unit 12 and have local expansion and contraction different from each other. Note that, a line in the first embodiment means a pixel string extending along the direction approximately perpendicular to sides of the pair of images to be concatenated, and on the side to be concatenated a plurality of lines are disposed along the direction of extending the side. The local expansion and contraction correction unit 16 individually corrects local expansion and contraction of the pair of images to be concatenated on the basis of the corresponding relationship between the lines in the pair of images to be concatenated, which have been detected by the corresponding relationship detection unit 14. The image concatenation unit 18 concatenates the pair of images to be concatenated, which have been subjected to correction of local expansion and contraction by the local expansion and contraction correction unit 16 into a single image. The concatenated image storage unit 20 stores the images concatenated by the image concatenation unit 18.

The corresponding relationship detection unit 14 is an example of a detection unit in the disclosed technique, the local expansion and contraction correction unit 16 is an example of a correction unit in the disclosed technique, and the image concatenation unit 18 is an example of a concatenation unit in the disclosed technique.

Figure 2:
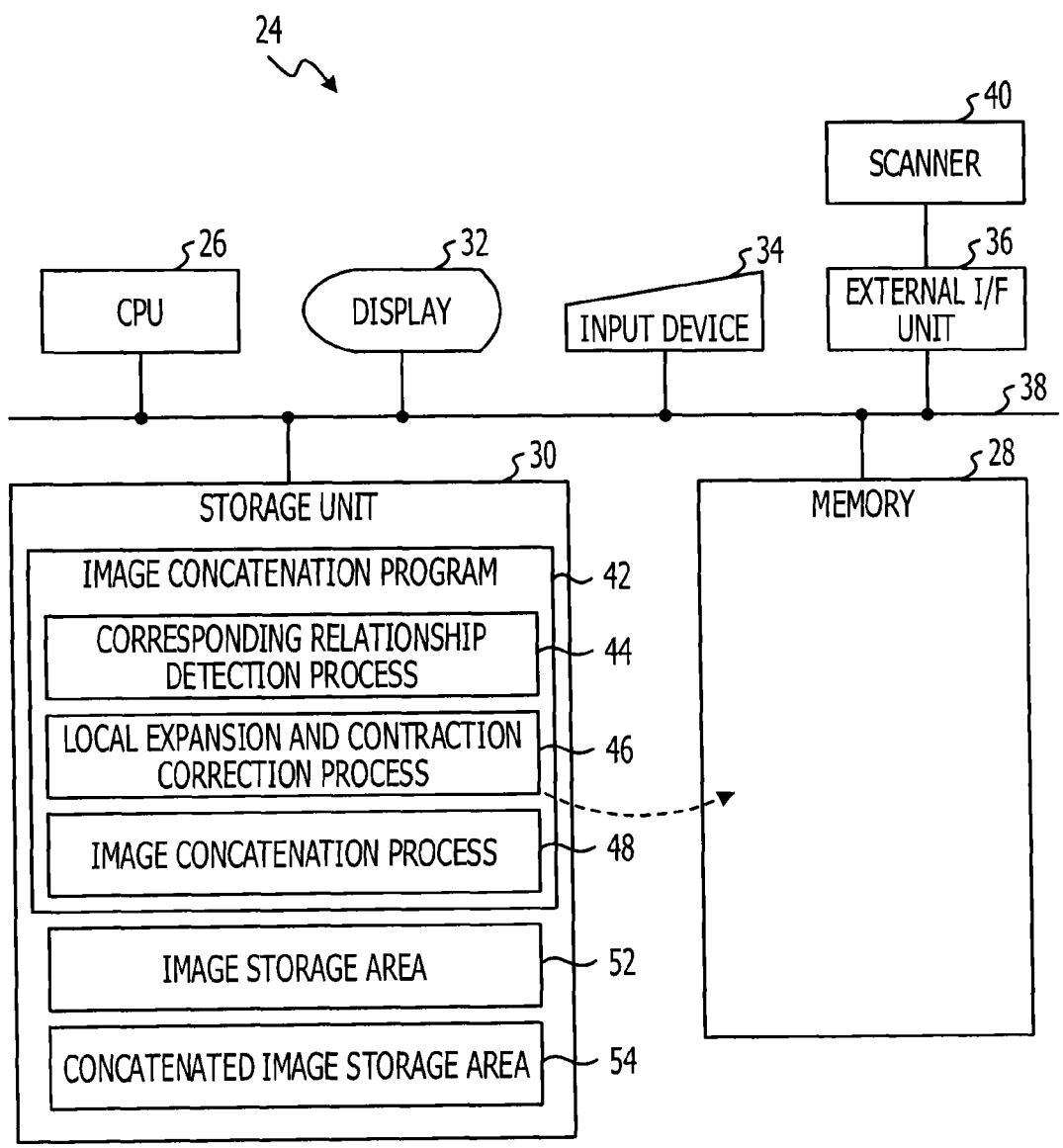
FIG. 2 is a schematic block diagram illustrating an example of a computer configured to function as the image processing apparatus.

It is possible to achieve the image processing apparatus 10, for example, by a computer 24 illustrated in FIG. 2. The computer 24 includes a CPU 26, a memory 28, a nonvolatile storage unit 30, a display 32, an input device 34, such as a keyboard, a mouse, or the like, and an external I/F unit 36. The CPU 26, the memory 28, the storage unit 30, the display 32, the input device 34, and the external I/F unit 36 are mutually connected through a bus 38. A scanner 40 is connected to the external I/F unit 36. The scanner 40 has a configuration of reading a document while transporting the document to be read.

In addition, it is possible to achieve the storage unit 30 by a hard disk drive (HDD), a flash memory, or the like. The storage unit 30, as a recording medium, stores an image concatenation program 42 that causes the computer 24 to function as the image processing apparatus 10, and is provided with an image storage area 52 and a concatenated image storage area 54. The CPU 26 reads the image concatenation program 42 from the storage unit 30 to load the program into the memory 28, and sequentially executes processes held by the image concatenation program 42.

The image concatenation program 42 includes a corresponding relationship detection process 44, a local expansion and contraction correction process 46, and an image concatenation process 48. The CPU 26 executes the corresponding relationship detection process 44 so as to operate as the corresponding relationship detection unit 14 illustrated in FIG. 1.

The CPU 26 also executes the local expansion and contraction correction process 46 so as to operate as the local expansion and contraction correction unit 16 illustrated in FIG. 1. The CPU 26 also executes the image concatenation process 48 so as to operate as the image concatenation unit 18 illustrated in FIG. 1.

In the case of achieving the image processing apparatus 10 by the computer 24, the image storage area 52 functions as the image storage unit 12 illustrated in FIG. 1, and the concatenated image storage area 54 functions as the concatenated image storage unit 20 illustrated in FIG. 1. Thus, the computer 24 performing the image concatenation program 42 functions as the image processing apparatus 10. The image concatenation program 42 is an example of the image processing program in the disclosed technique.

In addition, it is also possible to achieve the image processing apparatus 10, for example, by a semiconductor integrated circuit, more particularly, an application specific integrated circuit (ASIC), or the like.

Next, operation according to the first embodiment is described. When the scanner 40 completes reading of sub-documents, and image data of a pair of images to be concatenated is output from the scanner 40, and is stored in the image storage unit 12, the image processing apparatus 10 performs image concatenation processing illustrated in FIG. 3. In step 70 of the image concatenation processing, the corresponding relationship detection unit 14 reads from the image storage unit 12 the image data of the pair of images to be concatenated, which is stored in the image storage unit 12.

In subsequent step 72, the corresponding relationship detection unit 14 performs corresponding relationship detection processing for detecting a corresponding relationship between lines in the pair of images to be concatenated. In the following, the corresponding relationship detection processing according to the first embodiment is described with reference to FIG. 4.

In step 80 of the corresponding relationship detection processing, the corresponding relationship detection unit 14 performs binarization processing on a pair of images to be concatenated (hereinafter the individual images are distinctively referred to as a left image and a right image).

In this regard, if the images that have been outputted from the scanner 40 and stored in the image storage unit 12 are already binarized images, the above-described binarization processing is not performed. Various methods are already known to convert images other than binarized images into binarized images and, for example, it is possible to apply a method of converting a color image (a 24-bit full color image) into an eight-bit grayscale image, and then converting the grayscale image into a binarized image, or the like. Hereinafter pixels in the background on a binarized image are referred to as white pixels, and the other pixels are referred to as black pixels.

In subsequent step 82, the corresponding relationship detection unit 14 sets a pixel string (a pixel string of the coordinates (x, y)) on the right side in a left image to a pixel string to be processed. In the coordinates (x, y) of a pixel string to be processed, it is assumed that x=Nl, y=1 to Ml, where Ml is a height of the left image, and Nl is a width of the left image. Here, the right side of the left image which has been set to the pixel string to be processed is a side to be concatenated with the right image. In the following, a feature quantity for each line on the right side of the left image is obtained.

In step 84, the corresponding relationship detection unit 14 sets a variable y to 1. In subsequent step 86, the corresponding relationship detection unit 14 determines whether a pixel of coordinates (Nl, y) included in a pixel string to be processed is a black pixel or not. If the determination in step 86 is NO (in the case of a white pixel), the processing proceeds to step 90. In step 90, the corresponding relationship detection unit 14 sets a feature quantity of the pixel of coordinates (Nl, y) to 0, and the processing proceeds to step 92. A certain value other than 0 may be used as a feature quantity of a white pixel.

Figure 5:
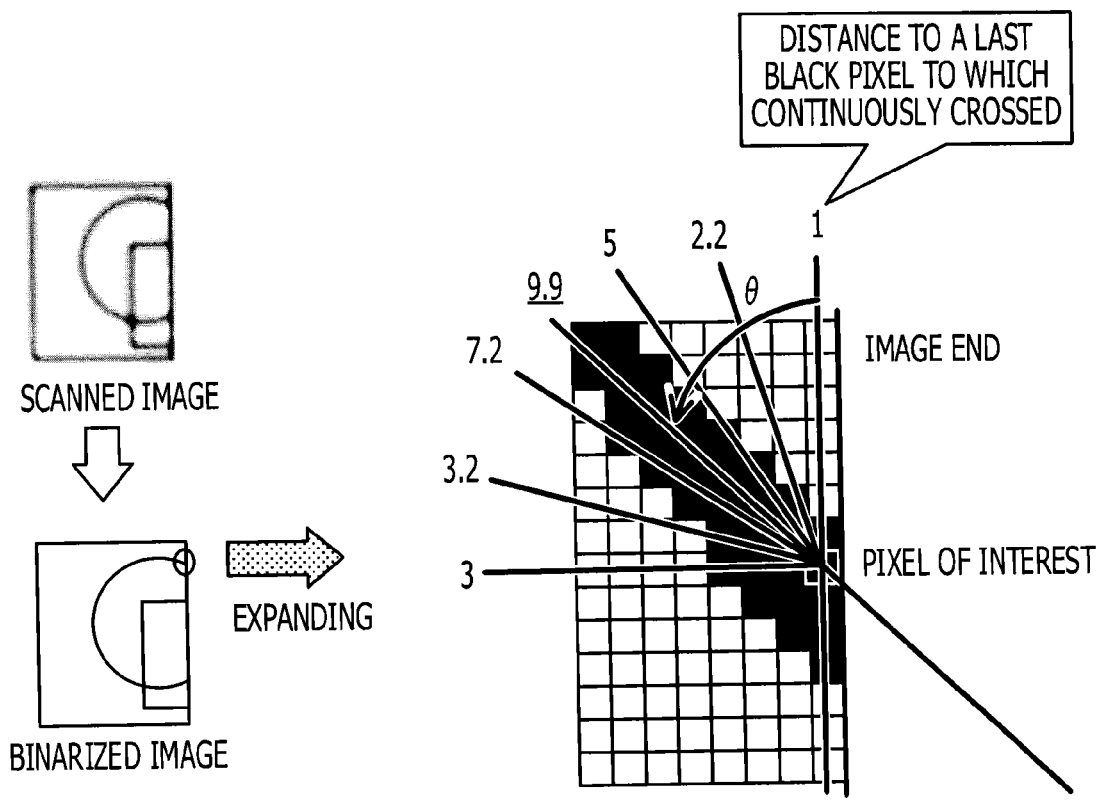
FIG. 5 is an explanatory diagram for explaining an example of calculating a direction in which a line continues longest from a black pixel.

On the other hand, if the pixel of coordinates (Nl, y) is a black pixel, the determination in step 86 is YES, and the processing proceeds to step 88. In step 88, the corresponding relationship detection unit 14 calculates a direction in which black pixels continue longest from the pixel of coordinates (Nl, y) as a feature quantity of the pixel of coordinates (Nl, y). Specifically, as illustrated in FIG. 5 as an example, a line is extended radially from the pixel of interest (pixel of coordinates (Nl, y)), and a direction in which black pixels continue longest is obtained, and the obtained direction is determined to be a feature quantity of the pixel of interest. Regarding a direction in which a line is extended radially from the pixel of interest, for example, it is possible to use an angle produced by dividing 180° into 12 equal angles as one unit. In the example in FIG. 5, a distance to a last black pixel in the sequence of black pixels is "1" at 0°, "2.2" at 15°, "5" at 30°, "9.9" at 45°, "7.2" at 60°, "3.2" at 75°, and "3" at 90°, and thus the feature quantity of the pixel of interest becomes "45".

In subsequent step 92, the corresponding relationship detection unit 14 stores the feature quantity at the pixel (Nl, y), which has been set in step 88 or step 90, into the memory 28, or the like, for example. In subsequent step 94, the corresponding relationship detection unit 14 determines whether the variable y is smaller than or equal to the height Ml of the left image. If the determination in step 94 is YES, the processing proceeds to step 96, and in step 96, the corresponding relationship detection unit 14 increments the variable y by 1, and the processing returns to step 86. Accordingly, the processing from step 86 to step 96 is repeated until the determination in step 94 is NO.

When array data including the feature quantities of all the pixels of the right side of the left image as Ml elements is obtained as the feature quantities of the right side of the left image, the variable y becomes larger than the height Ml of the left image, the determination in step 94 is NO, and the processing proceeds to step 98. In step 98, the corresponding relationship detection unit 14 sets a pixel string (a pixel string of the coordinates (x, y)) on the left side in a right image to a pixel string to be processed. In the coordinates (x, y) of a pixel string to be processed, it is assumed that x=1, y=1 to Mr, where Mr is a height of the right image, and Nr is a width of the right image. Here, the left side of the right image which is set to the pixel string to be processed is a side to be concatenated with the left image. In the following, a feature quantity for each line on the left side of the right image is obtained.

In step 100, the corresponding relationship detection unit 14 sets a variable y to 1. In subsequent step 102, the corresponding relationship detection unit 14 determines whether a pixel of coordinates (1, y) included in a pixel string to be processed is a black pixel or not. If the determination in step 102 is NO (in the case of a white pixel), the processing proceeds to step 106. In step 106, the corresponding relationship detection unit 14 sets a feature quantity of the pixel of coordinates (1, y) to 0, and the processing proceeds to step 108. A certain value other than 0 may be used as a feature quantity of a white pixel.

On the other hand, if the pixel of coordinates (1, y) is a black pixel, the determination in step 102 is YES and the processing proceeds to step 104. In step 104, in the same manner as step 88 described before, the corresponding relationship detection unit 14 calculates a direction in which black pixels continue longest from the pixel of coordinates (1, y) as a feature quantity of the pixel of coordinates (Nr, y).

In subsequent step 108, the corresponding relationship detection unit 14 stores the feature quantity at the pixel (1, y), which has been set in step 104 or step 106, into the memory 28, or the like, for example. In subsequent step 110, the corresponding relationship detection unit 14 determines whether the variable y is smaller than or equal to the height Mr of the right image. If the determination in step 110 is YES, the processing proceeds to step 112, then in step 112, the corresponding relationship detection unit 14 increments the variable y by 1, and the processing returns to step 102. Accordingly, the processing from step 102 to step 112 is repeated until the determination in step 110 is NO.

When array data including the feature quantities of all the pixels of the left side of the right image as Mr elements is obtained as the feature quantities of the left side of the right image, the variable y becomes larger than the height Mr of the right image, the determination in step 110 is NO, and the processing proceeds to step 114. In and after subsequent step 114, the corresponding relationship detection unit 14 applies dynamic programming (DP) with fixed endpoints to the array of the feature quantities ai (i=1, . . . , Ml) of the right side of the left image and the array of the feature quantities bj (j=1, . . . , Mr) of the left side of the right image to obtain corresponding relationships between the lines.

That is, in step 114, the corresponding relationship detection unit 14 calculates a variable Xij and a cost Cij on the feature quantity ai of the right side of the left image and the feature quantity bj of the left side of the right image on the basis of recurrence relations of dynamic programming (the following expressions (1) and (2)), and records the selected path.

$$Xij = |ai - bj| \quad (1)$$

$$Cij = \mathrm{MIN}\{Ci-2, j-1+Xi-1, j+Xij,$$

$$Ci-1, j-1+2 \times Xij,$$

$$Ci-1, j-2+Xi, j-1+Xij\} \quad (2)$$

Figure 6A:
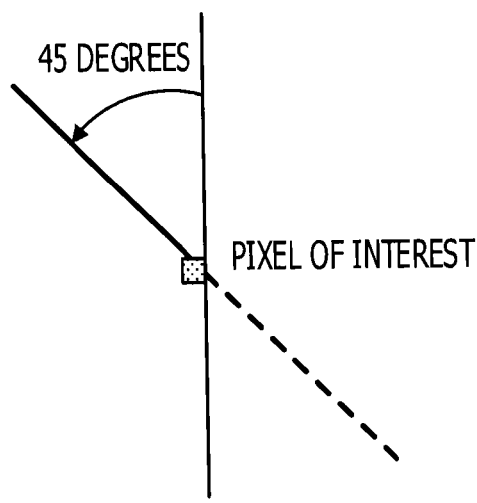
FIG. 6A is a schematic diagram illustrating an example of a feature quantity on a right side of a left image.
Figure 6B:
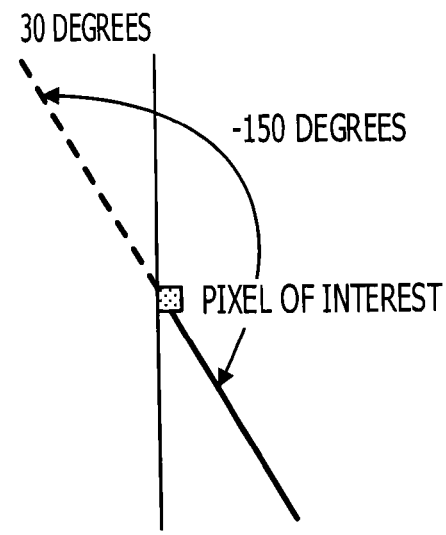
FIG. 6B is a schematic diagram illustrating an example of a feature quantity on a left side of a right image.

Note that, "| |" in the expression (1) denotes a difference in directions indicated by the feature quantities. For example, the difference between the two directions illustrated in FIG. 6A and FIG. 6B becomes 15° (=45°−30°, or, 45°−(−150°)+180°). The difference between the directions becomes a value 0° or more and less than 90° by adding or subtracting 180° to or from the value of (ai−bj) all the time. An example of a calculation result of the variable Xij using the expression (1) is illustrated in FIG. 7A. Also, MIN( ) in the expression (2) denotes an operator indicating selection of a minimum value in the curly braces. An example of a calculation result of the cost Cij using the expression (2) is illustrated in FIG. 7B.

Figure 8:
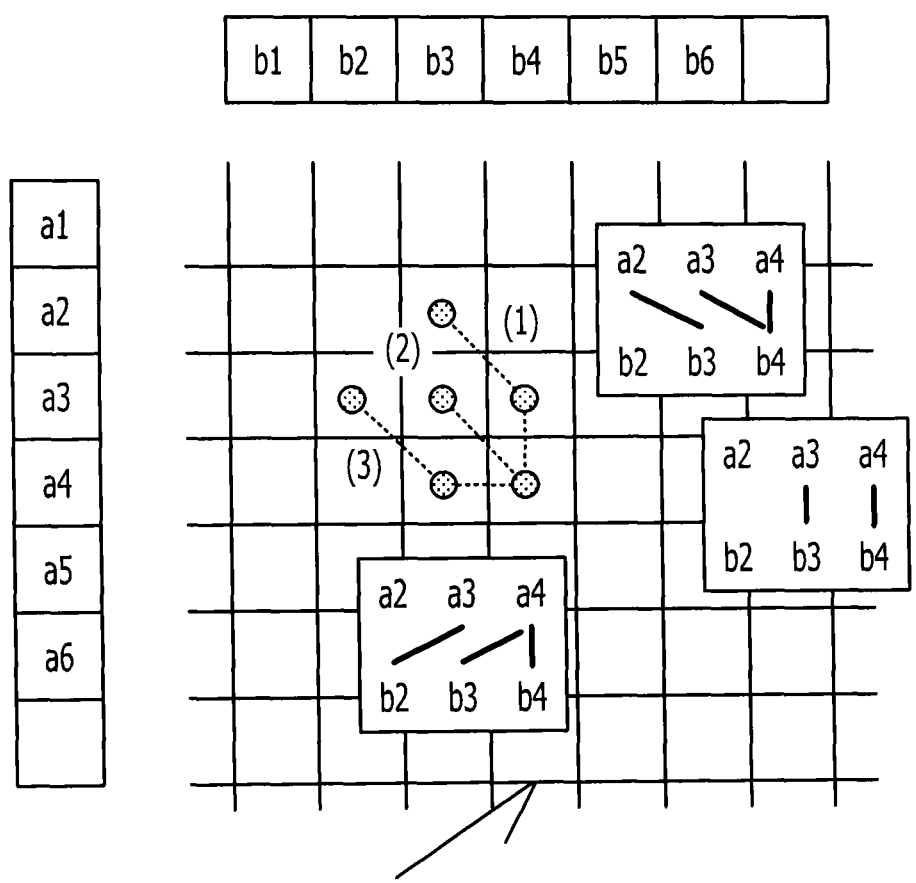
FIG. 8 is an explanatory diagram for explaining a path selected in accordance with calculation of a cost.

Also, as illustrated in FIG. 7C, three terms disposed in MIN( ) in the expression (2) are corresponding to paths (1) to (3) that are different from one another in a matrix formed by the feature quantity ai of the right side of the left image and the feature quantity bj of the left side of the right image (also refer to FIG. 8). At the time of calculating the cost Cij by the expression (2), which term (path) among the three terms of MIN( ) is selected is also recorded. An example of a recording result of a path is illustrated in FIG. 7C.

In subsequent step 116, the corresponding relationship detection unit 14 searches for, from $C_{Ml, Mr}$ (a lower right corner in the cost table) toward $C_{0, 0}$ (an upper left corner of the cost table), a route including a path having a minimum cost in the cost table of dynamic programming (refer to FIG. 7B) by back tracing. For example, in FIG. 7C, when it is thought that back tracing is performed from (i, j)=(3, 3), a path recorded in a cell (i, j)=(3, 3) is (3), and thus back tracing is performed, along the route denoted as the path (3) in FIG. 8, from (3, 3)→(3, 2)→(2, 1). Next, a path (1) is recorded in a cell of (i, j)=(2, 1), and thus it is possible to go back, along the route illustrated as the path (1) in FIG. 8, from (2, 1)→(1, 1)→start point. Accordingly, a route that goes back from (3, 3)→(3, 2)→(2, 1)→(1, 1)→start point is found by back trace.

Figure 9:
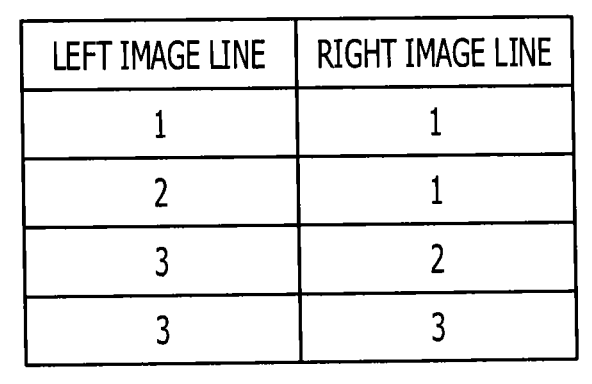

In subsequent step 118, the corresponding relationship detection unit 14 records a route that is found by the search in step 116, and converts the recorded route into corresponding relationship information indicating a corresponding relationship between line numbers of the lines on the right side of the left image and the left side of the right image. As an example, if a route that goes back (3, 3)→(3, 2)→(2, 1)→(1, 1)→start point is found in the search in step 116, a corresponding relationship illustrated in FIG. 9 is obtained as a corresponding relationship between the lines indicated by the corresponding relationship information. Note that, the recurrence relation in the expression (1) and the expression (2) are only simply examples. It is possible to control the characteristics of association between the feature quantities ai and bj by changing the recurrence relation, and to adjust the permissible degree of local expansion and contraction.

Figure 3:
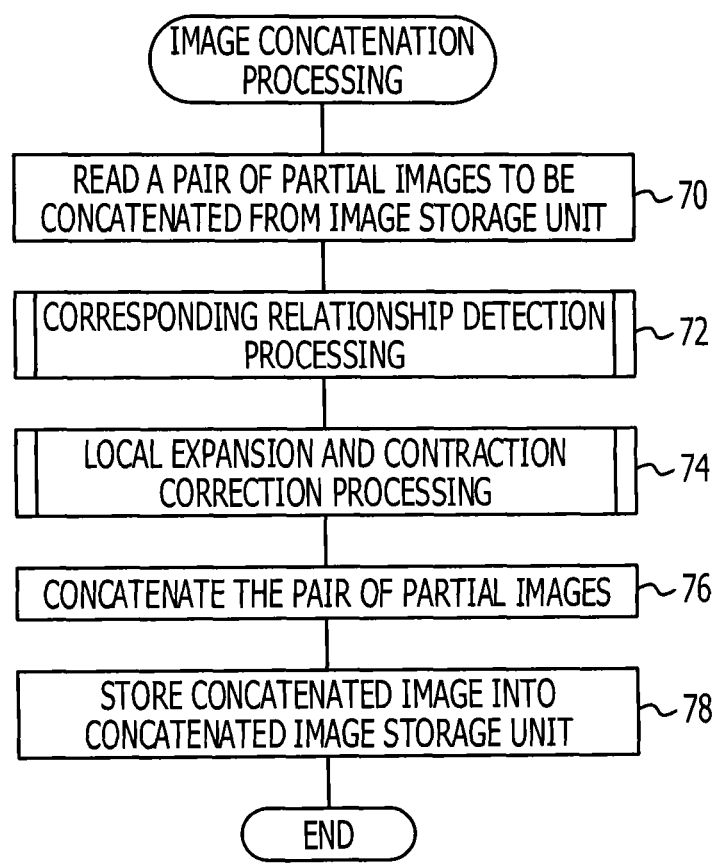
FIG. 3 is a flowchart illustrating image concatenation processing.

When the corresponding relationship detection processing is performed as described above, the processing proceeds to step 74 in the image concatenation processing (FIG. 3). In step 74 in the image concatenation processing, the local expansion and contraction correction unit 16 performs local expansion and contraction correction processing. In the following, the local expansion and contraction correction processing is described with reference to FIGS. 10A and 10B.

In step 130 of the local expansion and contraction correction processing, the local expansion and contraction correction unit 16 sets pairs of line numbers corresponding to the left image and the right image indicated by the corresponding relationship information obtained by the corresponding relationship detection unit 14 in an array P={($A_i$, $B_i$)} (i=1 to N). Further, in step 132, the local expansion and contraction correction unit 16 sorts the array P in ascending order of the variable $A_i$ or the variable $B_i$.

Figure 11:
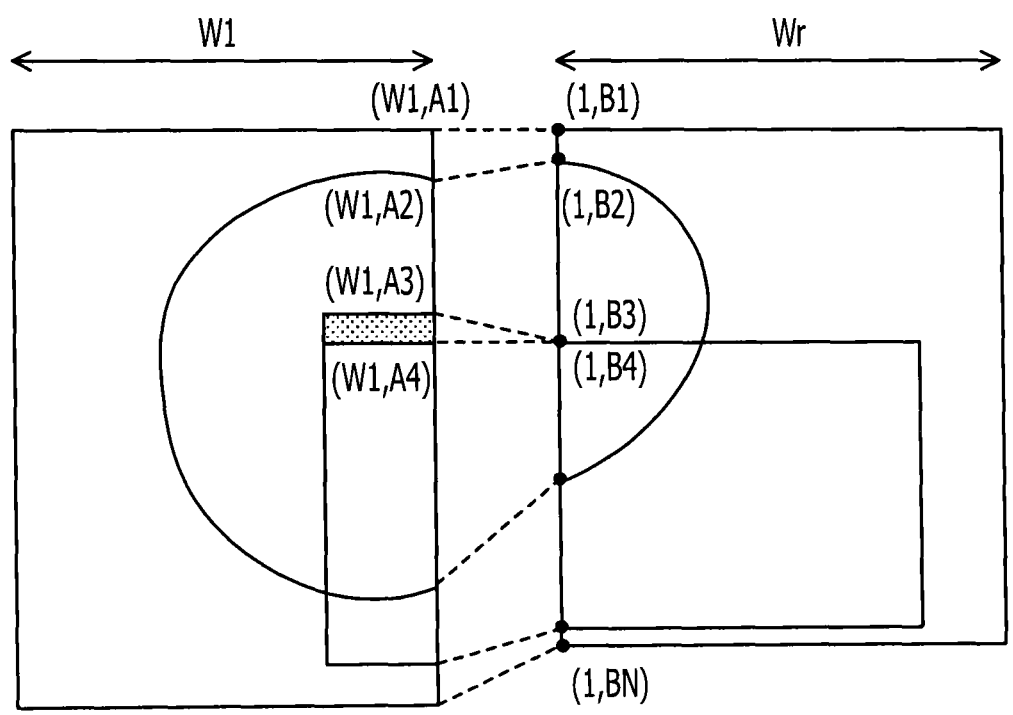
FIG. 11 is an image diagram for explaining deletion of a duplicated line in the local expansion and contraction correction processing.

An example of a relationship between the image and the array P at this point in time is illustrated in FIG. 11. In FIG. 11, it is assumed that a width of the left image is Wl, and a width of the right image is Wr. A pair of first line numbers corresponding to the left image and the right image are ($A_1$, $B_1$), and thus a point ($W_1$, $A_1$) on the right side of the left image and a point (1, $B_1$) on the left side of the right image are corresponding points. Here, a portion defined by a point ($W_1$, $A_3$) and a point ($W_1$, $A_4$) on the right side of the left image is in an extended state by slippage of a roller at the time of reading the left image, or the like. In the example in FIG. 11, as illustrated by broken lines in FIG. 11, corresponding relationships of lines of the left image and the right image are obtained as ($A_3$, $B_3$) and ($A_4$, $B_4$) from the corresponding relationship information, and values (line numbers) of $B_3$ and $B_4$ indicate the same value. In the subsequent processing, lines in an area extended in the left image with respect to the right image are to be deleted.

First, in step 134, the local expansion and contraction correction unit 16 sets the variable i to 1. In subsequent step 136, the local expansion and contraction correction unit 16 determines whether all the pairs of the array P have been evaluated or not. If the determination in step 136 is NO, the processing proceeds to step 138. In step 138, the local expansion and contraction correction unit 16 determines whether the value (line number) of the variable $B_i$ is equal to the value (line number) of the variable $B_{i+1}$ or not. If the determination in step 138 is NO, the processing proceeds to step 150. In step 150, the local expansion and contraction correction unit 16 increments the variable i by 1, and the processing returns to step 136.

On the other hand, if the determination in step 138 is YES, it is possible to determine that the left image is extended with respect to the right image, and thus the processing proceeds to step 140. In step 140, the local expansion and contraction correction unit 16 deletes $D=(A_{i+1}-A_i)$ lines from the next line to the line of the line number set in the variable $A_i$ to the line of the line number set in the variable $A_{i+1}$ in the left image, and deletes information about a pair of lines $(A_{i+1}, B_{i+1})$ from the array P. The left image becomes smaller in height of the image by the number of lines $D=(A_{i+1}-A_i)$.

In subsequent step 142, the local expansion and contraction correction unit 16 sets a value of 1 added to i to the variable j. Further, in step 144, the local expansion and contraction correction unit 16 decrements the line number set in the variable $A_j$ by D. In subsequent step 146, the local expansion and contraction correction unit 16 determines whether the variable j is smaller than or equal to the number of elements in the array P. If the determination in step 146 is YES, the processing proceeds to step 148. In step 148, the local expansion and contraction correction unit 16 increments the variable j by 1, and returns to step 144. Accordingly, until the determination in step 146 is NO, processing from step 144 to step 148 is repeated.

With the deletion of D lines from the left image in the preceding step 140, the line number of each line in the left image set in the array P is moved up in step 142 to step 148. The processing from step 140 to step 148 is performed each time the determination in step 138 is YES, that is, each time an extended portion of the left image with respect to the right image is found. Accordingly, if there are a plurality of lines in the left image that are corresponding to a same line in the right image, the plurality of lines that are corresponding to the same line in the right image are deleted, excluding one line in the plurality of lines, from the left image.

For example, when attention is given to a pair of lines $(A_3, B_3)$ and a pair of lines $(A_4, B_4)$ illustrated in FIG. 11, the line numbers set to the variables $B_3$ and $B_4$ are the same. Accordingly, it is understood that a line of the line number set in the variable $A_3$ and a line of the line number set in the variable $A_4$ specify the same position on the document. In the processing as described above, information about the pair of lines $(A_4, B_4)$ is deleted from the array P, and $D=(A_{i+1}-A_i)$ lines from the next line to the line of the line number set in the variable $A_i$ to the line of the line number set in the variable $A_{i+1}$ are deleted from the left image. Also, with the deletion of the lines, the line numbers on the left image of the array P are shifted, and thus the subsequent line numbers in the array P are decremented by the number of deleted lines.

If the determination in step 136 is YES, the processing proceeds to step 152. In and after step 152, lines in an area extended in the right image with reference to the left image are deleted. That is, first, in step 152, the local expansion and contraction correction unit 16 sets the variable i to 1. In subsequent step 154, the local expansion and contraction correction unit 16 determines whether all the pairs of the array P have been evaluated or not. If the determination in step 154 is NO, the processing proceeds to step 156. In step 156, the local expansion and contraction correction unit 16 determines whether the value (line number) of the variable A is equal to the value (line number) of the variable $A_{i+1}$ or not. If the determination in step 156 is NO, the processing proceeds to step 168. In step 168, the local expansion and contraction correction unit 16 increments the variable i by 1, and the processing returns to step 154.

On the other hand, if the determination in step 156 is YES, it is possible to determine that the right image is extended with respect to the left image, and thus the processing proceeds to step 158. In step 158, the local expansion and contraction correction unit 16 deletes $E=(B_{i+1}-B_i)$ lines from the next line to the line of the line number set in the variable $B_i$ to the line of the line number set in the variable $B_{i+1}$ in the right image, and deletes information about a pair of lines $(A_{i+1}, B_{i+1})$ from the array P. The right image becomes smaller in height of the image by the number of lines $E=(B_{i+1}-B_i)$.

In subsequent step 160, the local expansion and contraction correction unit 16 sets a value of 1 added to i to the variable j. Further, in step 162, the local expansion and contraction correction unit 16 decrements the line number set in the variable $B_j$ by E. In subsequent step 164, the local expansion and contraction correction unit 16 determines whether the variable j is smaller than or equal to the number of elements in array P. If the determination in step 164 is YES, the processing proceeds to step 166. In step 166, the local expansion and contraction correction unit 16 increments the variable j by 1, and returns to step 162. Accordingly, until the determination in step 164 is NO, the processing from step 162 to step 166 is repeated.

With the deletion of E lines from the right image in the preceding step 158, the line number of each line in the left image set in the array P is moved up in step 160 to step 166. The processing from step 158 to step 166 is performed each time the determination in step 156 is YES, that is, each time an extended portion of the right image with respect to the left image is found. Accordingly, if there are a plurality of lines in the right image that are corresponding to a same line in the left image, the plurality of lines that are corresponding to the same line in the left image are deleted, excluding one line of the plurality of lines, from the right image.

Figure 12:
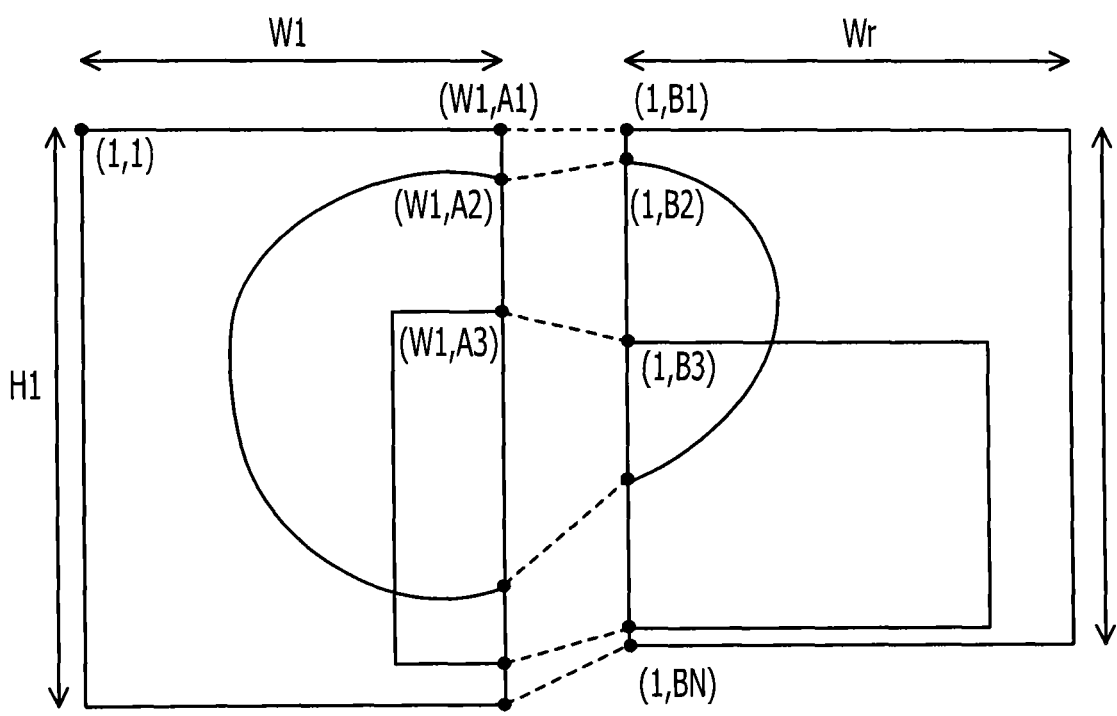
FIG. 12 is an image diagram for explaining deletion of a duplicated line in the local expansion and contraction correction processing.

If the determination in step 154 is YES, the processing proceeds to step 170. An example of a relationship of the left image, the right image, and the array P at the point in time when the processing to delete all the lines of the places that are extended as described above is performed on the left image and the right image illustrated in FIG. 11 is illustrated in FIG. 12.

In step 170, the local expansion and contraction correction unit 16 sets the size (width×height) of the left image and the right image having been subjected to the above-described processing to Wl×Hl, Wr×Hr, respectively. In and after subsequent step 172, one of the images is used as a reference, and the other of the images is subjected to expansion and contraction correction. Local misalignment between the left image and the right image is a little compared with the size of the images, and thus either the left image or the right image may be used as a reference. In and after step 172, for example, the left image is used as a reference, and the right image is subjected to the expansion and contraction correction.

First, in step 172, the local expansion and contraction correction unit 16 prepares an image area M having a same width as the width Wr of the right image and a same height as the height Hl of the left image as an image area for storing the right image after the expansion and contraction correction. In subsequent step 174, the local expansion and contraction correction unit 16 sets the variable i to 2. In step 176, the local expansion and contraction correction unit 16 expands or contracts an image of a rectangular area having a vertex of coordinates $(1, B_{i-1})$ in the upper right corner and a vertex of coordinates (Wr, $B_{i-1}$) in the lower right corner in the right image into an image having a height ($A_i$–$A_{i-1}$) and a width Wr. This corresponds to operation of expanding or contracting the above-described rectangular area of the right image using the corresponding area size of the left image as a reference.

In subsequent step 178, the local expansion and contraction correction unit 16 writes the rectangular area image expanded or contracted in step 176 into a rectangular area having a vertex of coordinates (1, $A_{i-1}$) in the upper right corner and a vertex of coordinates (Wr, $A_{i-1}$) in the lower right corner in the image area M. In subsequent step 180, the local expansion and contraction correction unit 16 determines whether all the pairs of the array P have been evaluated or not. If the determination in step 180 is NO, the processing proceeds to step 182. In step 182, the local expansion and contraction correction unit 16 increments the variable i by 1, and the processing returns to step 176.

Figure 13:
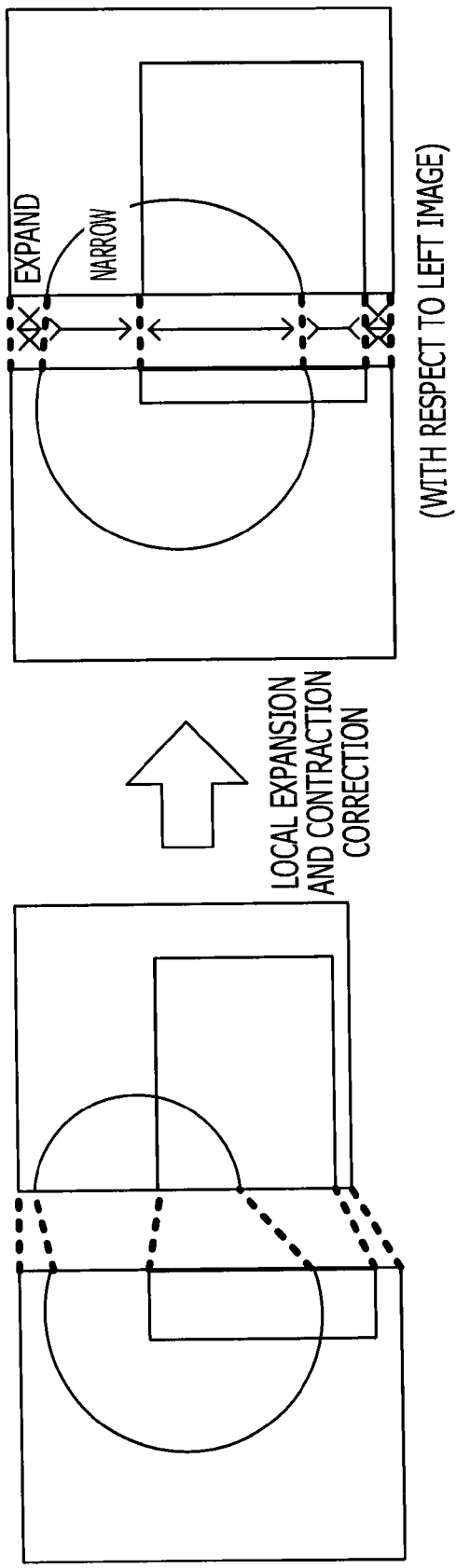
FIG. 13 is an image diagram for explaining local expansion and contraction correction performed by the local expansion and contraction correction processing.

Accordingly, the processing from step 176 to step 182 is repeated until the determination in step 180 is YES. When the determination in step 180 is YES, the local expansion and contraction correction processing is terminated. As a result, local expansion or contraction is performed using, as a unit, the rectangular area having a vertex of coordinates (1, $B_{i-1}$) in the upper right corner and a vertex of coordinates (Wr, $B_{i-1}$) in the lower right corner in the right image, as illustrated in an example of FIG. 13, so that the right image is written into the image area M in a state in which the height of the right image is matched with the height Hl of the left image.

When the local expansion and contraction correction processing is complete, the processing proceeds to step 76 of the image concatenation processing in FIG. 3. In step 76, the image concatenation unit 18 performs image concatenation processing in which the left image and the right image having been subjected to the local expansion and contraction and written into the image area M are concatenated into a single image using the right side of the left image and the left side of the right image as a boundary. In addition, in subsequent step 78, the image concatenation unit 18 stores the image obtained by the image concatenation processing in step 76 in the concatenated image storage unit 20, and the image concatenation processing is terminated.

As described above, in the first embodiment, corresponding relationships between lines of images to be concatenated are detected, and local expansion and contraction is corrected on the images to be concatenated on the basis of the detected corresponding relationships between the lines. Accordingly, in the case where the scanner 40 separately reads a document that is cut into sub-documents readable by the scanner 40, and thus there are a plurality of partial images having local expansion and contraction different from each other, it is possible to suppress the occurrence of misalignment over the entire length of the boundary of the partial images.

Also, in the first embodiment, feature quantities of the right side of the left image and the left side of the right image are obtained for each line, and a corresponding relationship between the lines is obtained by applying dynamic programming with fixed endpoints. Accordingly, for example, compared with a second embodiment described later, it is not particularly desired to detect the document transport amount at the time of detecting the corresponding relationship between the lines, and the configuration of the scanner 40 reading a document is simplified.

Second Embodiment

Next, the second embodiment of the disclosed technique is described. A same reference symbol is given to a same part as that in the first embodiment, and a description thereof is omitted.

Figure 14:
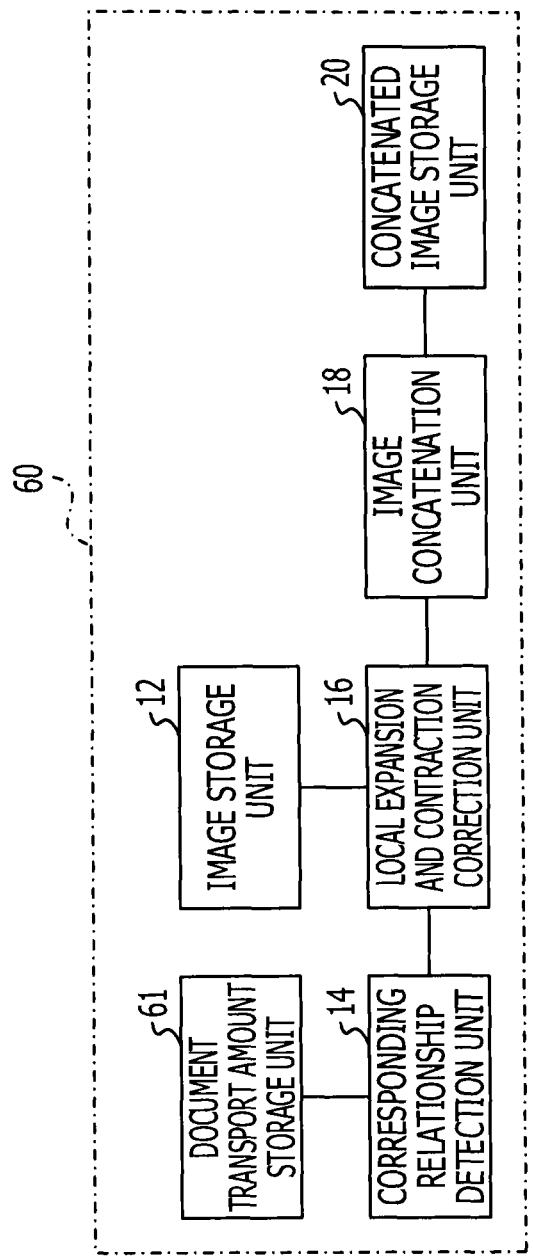
FIG. 14 is a functional block diagram of an image processing apparatus according to a second embodiment.

FIG. 14 illustrates an image processing apparatus 60 according to the second embodiment. As compared with the image processing apparatus 10 (FIG. 1) described in the first embodiment, the image processing apparatus 60 is different in that the image processing apparatus 60 includes a document transport amount storage unit 61. In the image processing apparatus 60, the document transport amount storage unit 61 is connected to the corresponding relationship detection unit 14, and the image storage unit 12 is connected to the local expansion and contraction correction unit 16.

Figure 15:
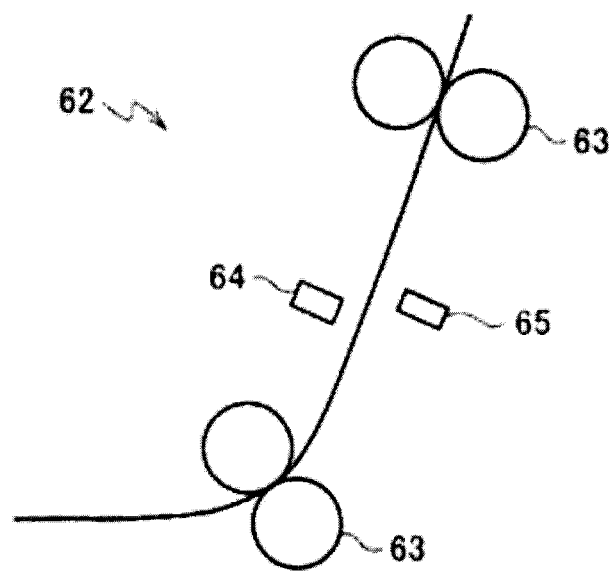
FIG. 15 is a schematic configuration diagram illustrating an example of a document reading unit of a scanner according to the second embodiment.

In the scanner 40 according to the second embodiment, for example, as illustrated in FIG. 15, a reading unit 62 transports a document by plural pairs of transport rollers 63, and a read sensor 64 and an amount-of-transport detection sensor 65 are arranged facing a document transport path therebetween.

The amount-of-transport detection sensor 65 includes a light source and an image sensor in the same manner as a sensor that measures the amount of movement of the mouse in an optical mouse. The document is irradiated with light (for example, laser light) emitted from the light source, reflected light is read by the image sensor, and the document transport amount is detected as an amount of movement of an image. The amount-of-transport detection sensor 65 outputs the detected document transport amount at the timing in synchronization with reading of the document for each line by the read sensor 64 as the document transport amount for each line.

The document transport amount storage unit 61 obtains a document transport amount for each line, which is sequentially output from the amount-of-transport detection sensor 65 of the scanner 40, and stores the obtained document transport amount in association with a line number. Accordingly, the document transport amount storage unit 61 stores document transport amount information illustrated in FIG. 16 as an example. In addition, in the scanner 40, a plurality of sub-documents forming one page of the original document are separately read, and thus, as illustrated in FIG. 17 as an example, the document transport amount storage unit 61 individually stores the document transport amount information for the left image and the right image. In this regard, it is not particularly desired to determine a unit of the document transport amount in the document transport amount information. In addition, it is possible to apply a certain unit of the amount-of-transport detection sensor 65.

Figure 4:
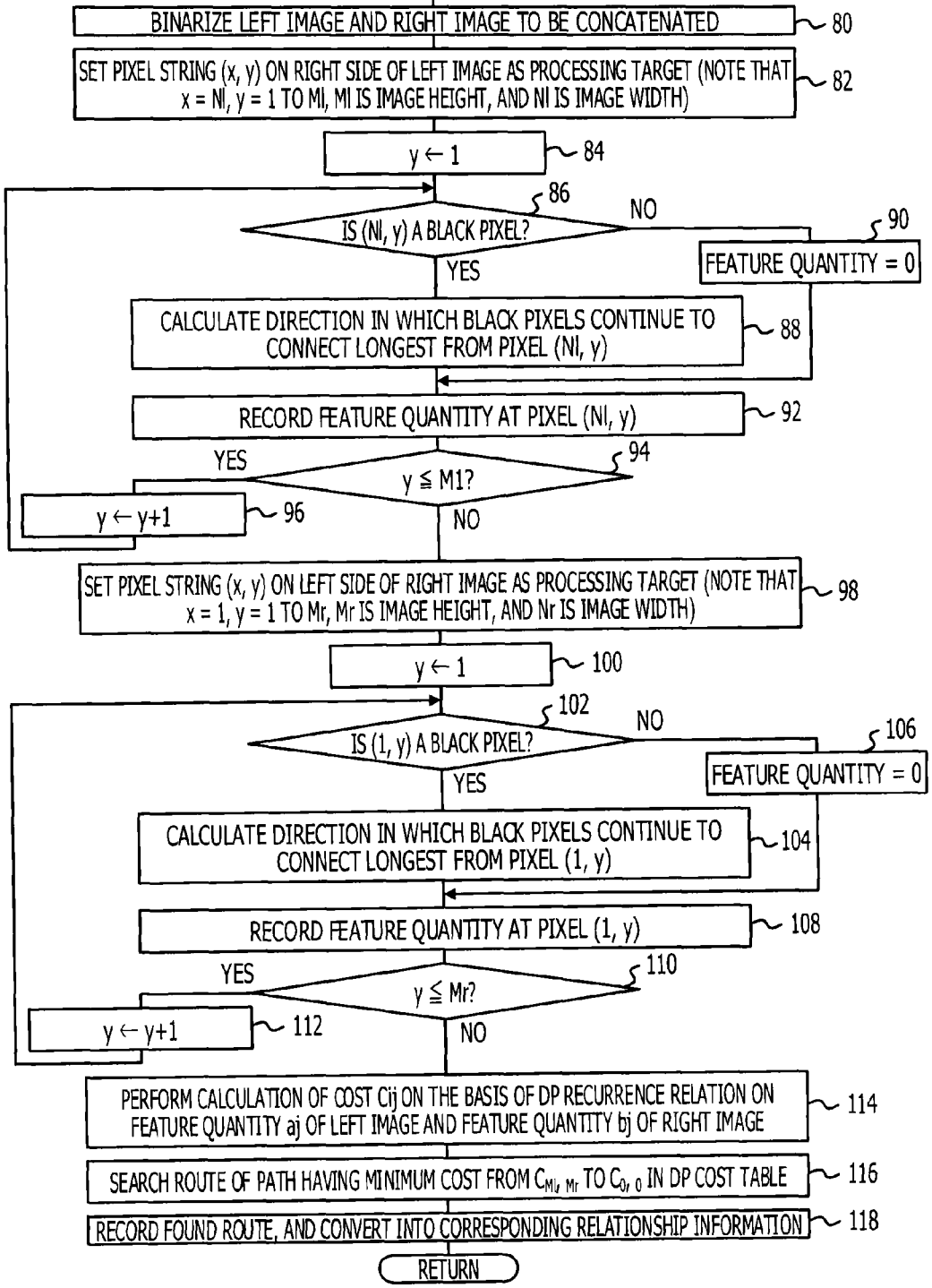
FIG. 4 is a flowchart illustrating corresponding relationship detection processing according to the first embodiment.
Figure 18:
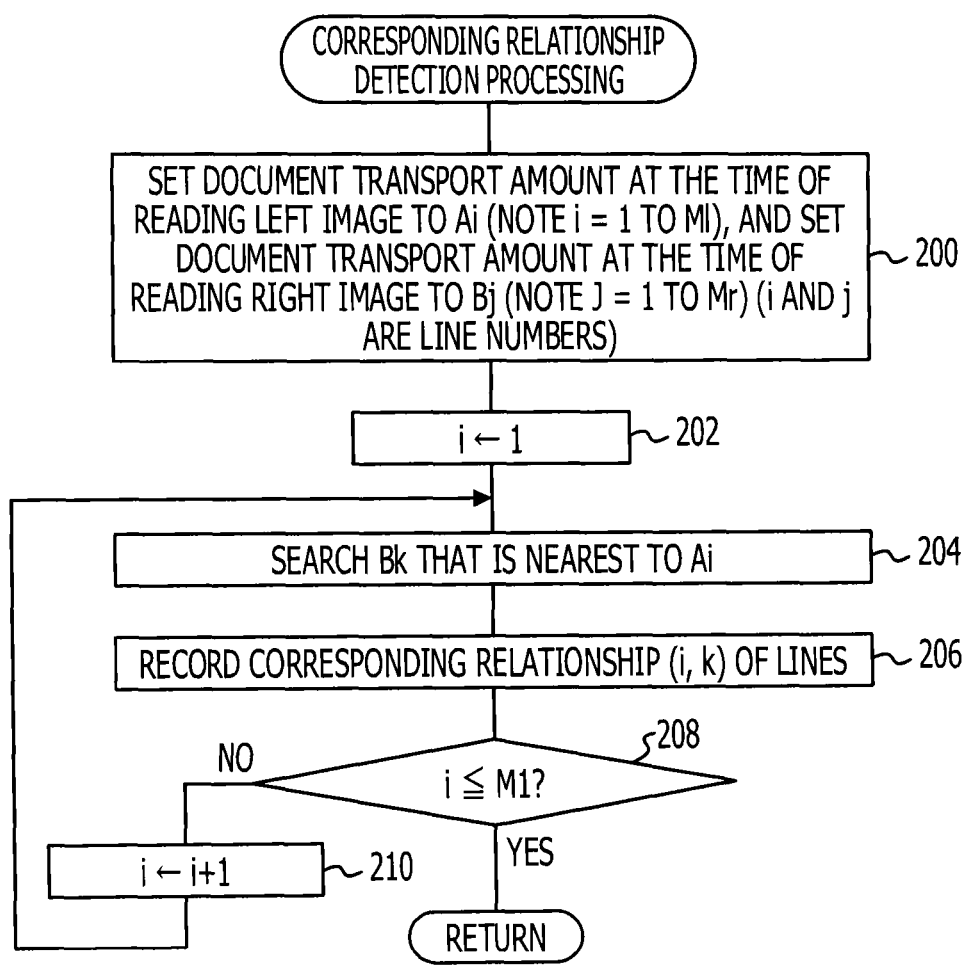
FIG. 18 is a flowchart illustrating corresponding relationship detection processing according to the second embodiment.

Next, operations of the second embodiment different from those of the first embodiment are described. In the first embodiment, the processing illustrated in FIG. 4 is performed as the corresponding relationship detection processing in step 72 of the image concatenation processing (FIG. 3). On the other hand, in the second embodiment, corresponding relationship detection processing illustrated in FIG. 18 is performed as the corresponding relationship detection processing in step 72 of the image concatenation processing (FIG. 3). In the following, the corresponding relationship detection processing according to the second embodiment is described.

In step 200 of the corresponding relationship detection processing, the corresponding relationship detection unit 14 sets a document transport amount for each line at the time of reading the left image in an array (i=1 to Ml) of the variable Ai, and sets a document transport amount for each line at the time of reading the right image in an array (j=1 to Mr) of the variable Bj. The variables i and j are line numbers of individual lines. In subsequent step 202, the corresponding relationship detection unit 14 sets the variable i to 1. In step 204, the corresponding relationship detection unit 14 searches for a variable Bk to which is set a document transport amount that is nearest to the document transport amount set in the variable Ai.

If the variable Bk having a document transport amount that is nearest to the document transport amount set in the variable Ai is found by the search in step 204, the corresponding relationship detection unit 14 stores, in subsequent step 206, a corresponding relationship (i, k) between lines of the left image and the right image into the memory 28, or the like, as corresponding relationship information. In subsequent step 208, the corresponding relationship detection unit 14 determines whether the variable i is smaller than or equal to the number of elements Ml of the array of the variable Ai or not. If the determination is YES, the processing proceeds to step 210, then the corresponding relationship detection unit 14 increments the variable i by 1 in step 210, and the processing returns to step 204.

Accordingly, the processing from step 204 to step 210 is repeated until the determination in step 208 is NO. In addition, as illustrated in FIG. 19, for example, the corresponding relationship information indicating a corresponding relationship between lines of the left image and the right image is stored in the memory 28, or the like. In addition, if the determination in step 208 is NO, the corresponding relationship detection processing is terminated.

In the second embodiment, the local expansion and contraction correction processing and other processing after that is the same as those in the first embodiment, and thus a description thereof is omitted.

As described above, also in the second embodiment, corresponding relationships between lines of images to be concatenated are detected, and local expansion and contraction is corrected on the images to be concatenated on the basis of the detected corresponding relationships between the lines. Accordingly, in the case where the scanner 40 separately reads a document that is cut into sub-documents readable by the scanner 40, and thus there are a plurality of partial images having local expansion and contraction different from each other, it is possible to suppress the occurrence of misalignment over the entire length of the boundary of the partial images.

In addition, in the second embodiment, when the scanner 40 reads a document, a document transport amount is detected for each line, and a corresponding relationship between the lines of the left image and the right image is obtained on the basis of the detected document transport amount for each line. Accordingly, although the amount-of-transport detection sensor 65 has to be disposed, and thus the configuration of the scanner 40 becomes complicated, the corresponding relationship detection processing becomes simplified, and thus load of the image processing apparatus 60 for obtaining a corresponding relationship between lines of the left image and the right image is reduced.

Third Embodiment

Next, a disclosed technique according to the third embodiment is described. A same reference symbols is given to a same part as that in the first embodiment and the second embodiment, and a description thereof is omitted.

Figure 20:
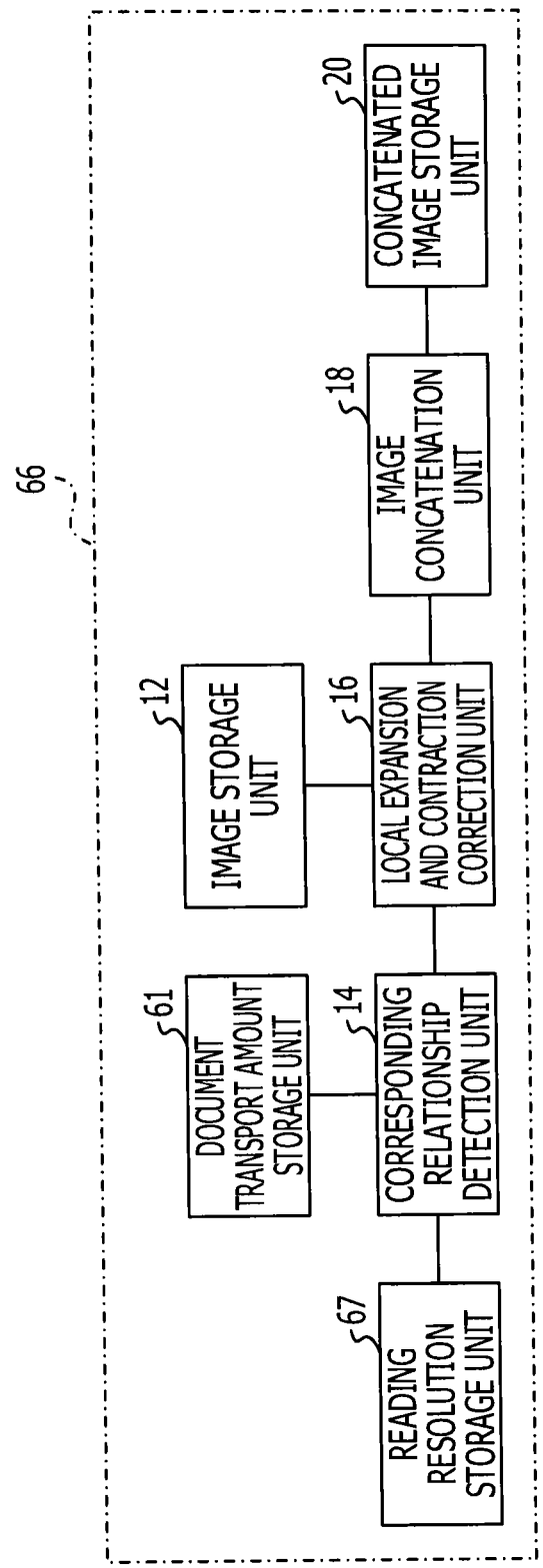
FIG. 20 is a functional block diagram of an image processing apparatus according to a third embodiment.

FIG. 20 illustrates an image processing apparatus 66 according to the third embodiment. As compared with the image processing apparatus 60 (FIG. 14) described in the second embodiment, the image processing apparatus 66 is different in that the image processing apparatus 60 includes a reading resolution storage unit 67. The reading resolution storage unit 67 obtains, from the scanner 40, a resolution at the time of reading a document by the scanner 40, and stores the obtained resolution. The reading resolution storage unit 67 is connected to the corresponding relationship detection unit 14.

Further, in the third embodiment, in the same manner as the second embodiment, the amount-of-transport detection sensor 65 is arranged in the reading unit 62 of the scanner 40. However, the amount-of-transport detection sensor 65 according to the third embodiment outputs a value in a standard unit system, such as a meter, or the like, as a document transport amount. Accordingly, as illustrated, for example, in FIG. 21, the document transport amount storage unit 61 according to the third embodiment stores document transport amount information indicating a document transport amount for each line, which is expressed by a value ("µm" in FIG. 21) in a standard unit system.

Figure 22:
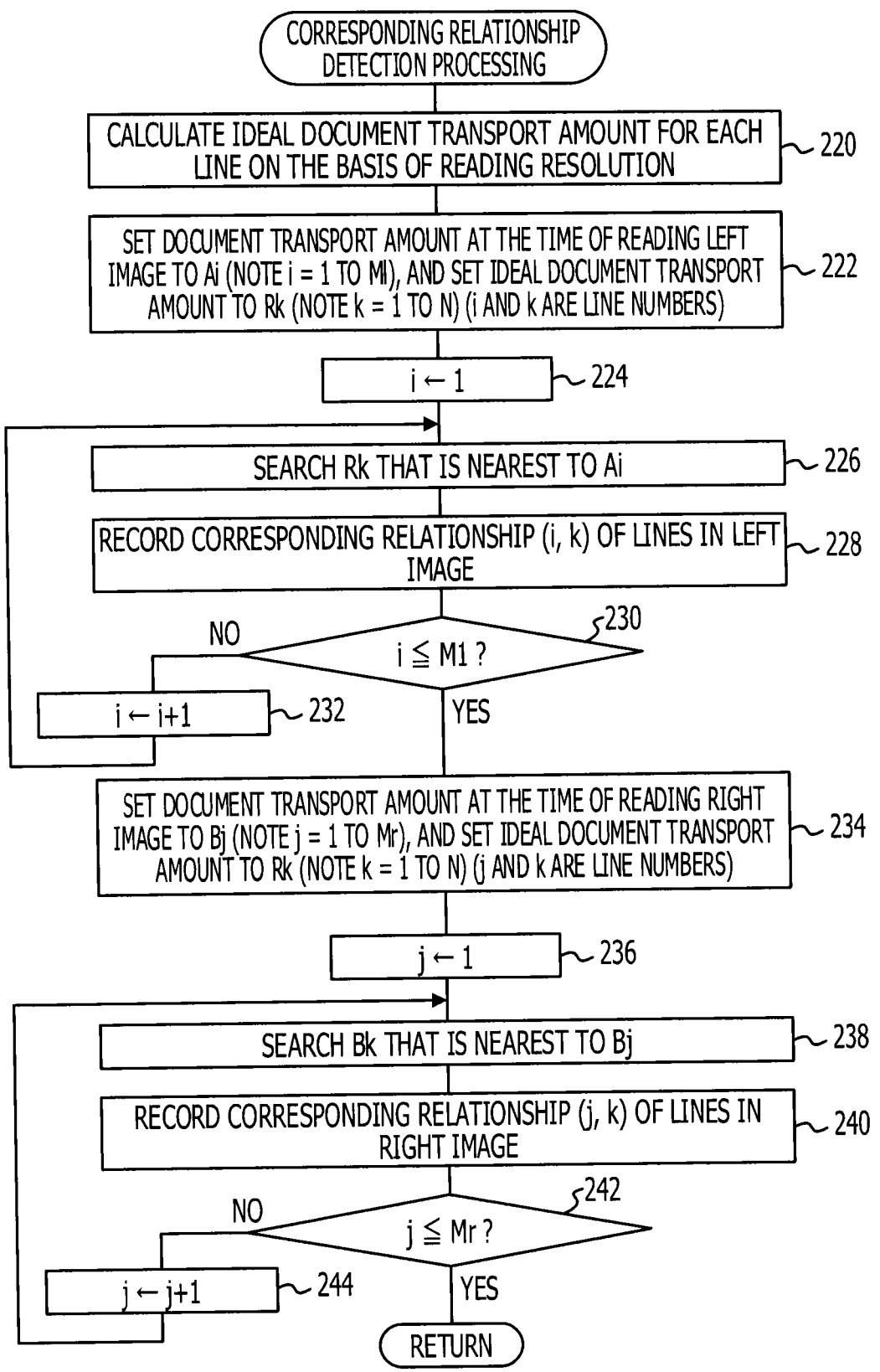
FIG. 22 is a flowchart illustrating corresponding relationship detection processing according to the third embodiment.

Next, operations according to the third embodiment are described. In the third embodiment, corresponding relationship detection processing illustrated in FIG. 22 is performed as the corresponding relationship detection processing in step 72 of the image concatenation processing (FIG. 3). In the following, the corresponding relationship detection processing according to the third embodiment is described.

In step 220 of the corresponding relationship detection processing, the corresponding relationship detection unit 14 calculates an ideal document transport amount for each line on the basis of reading resolution stored in the reading resolution storage unit 67. If the reading resolution (dpi) is already known, an ideal document transport amount for each line of the image obtained by reading a document is specified by an expression (3) as follows.

$$\text{ideal document transport amount} = (\text{image line number})/(\text{scan resolution}) \quad (3)$$

For example, in the case where a document is read by resolution of 300 dpi, 1 inch=25.4 mm=25400 µm, and thus it is possible to obtain the following expression (4) if a unit system is matched. However, in the expression (4), a first line of the image is determined to be a measurement start point of the document transport amount.

$$\text{ideal document transport amount (µm)} = (\text{line number of scanned image} - 1) \times 25400/300 \quad (4)$$

By the calculation in step 220, as illustrated in FIG. 23, for an example, an ideal amount of transport for each line of a document is obtained.

In the corresponding relationship detection processing (FIG. 18) described in the second embodiment, a corresponding relationship between the lines of the left image and the right image is obtained. On the other hand, in corresponding relationship detection processing according to the third embodiment, a corresponding relationship between the lines of the left image and a reference image assumed to have been transported by an ideal amount of transport, and a corresponding relationship between the lines of the right image and the reference image assumed to have been transported by the ideal amount of transport are obtained.

That is, in step 222, the corresponding relationship detection unit 14 sets a document transport amount for each line at the time of reading the left image in an array (i=1 to Ml) of the variable Ai, and sets an ideal document transport amount in an array (k=1 to N) of the variable Rk. The variables i and k are line numbers of individual lines. In subsequent step 224, the corresponding relationship detection unit 14 sets the variable i to 1. In step 226, the corresponding relationship detection unit 14 searches for a variable Rk to which is set a document transport amount that is nearest to the document transport amount set in the variable Ai.

If a variable Rk having a document transport amount that is nearest to the document transport amount set in the variable Ai is found by the search in step 226, the corresponding relationship detection unit 14 stores, in subsequent step 228, a corresponding relationship (i, k) between lines of the left image and the reference image into the memory 28, or the like, as corresponding relationship information. In subsequent step 230, the corresponding relationship detection unit 14 determines whether the variable i is smaller than or equal to the number of elements Ml of the array of the variable Ai or not. If the determination is YES, the processing proceeds to step 232, then the corresponding relationship detection unit 14 increments the variable i by 1 in step 232, and the processing returns to step 226.

Accordingly, the processing from step 226 to step 232 is repeated until the determination in step 230 is NO. In addition, the corresponding relationship information indicating a corresponding relationship between lines of the left image and the reference image is stored in the memory 28, or the like.

Further, if the determination in step 230 is NO, the processing proceeds to step 234. In step 234, the corresponding relationship detection unit 14 sets a document transport amount for each line at the time of reading the right image in an array (i=1 to Mr) of the variable Bj, and sets an ideal document transport amount in an array (k=1 to N) of the variable Rk. The variables j and k are line numbers of individual lines. In subsequent step 236, the corresponding relationship detection unit 14 sets the variable j to 1. In step 238, the corresponding relationship detection unit 14 searches for a variable Rk to which is set a document transport amount that is nearest to the document transport amount set in the variable Bj.

If a variable Rk having a document transport amount that is nearest to the document transport amount set in the variable Bj is found by the search in step 238, the corresponding relationship detection unit 14 stores, in subsequent step 240, a corresponding relationship (j, k) between lines of the right image and the reference image into the memory 28, or the like, as corresponding relationship information. In subsequent step 242, the corresponding relationship detection unit 14 determines whether the variable j is smaller than or equal to the number of elements Mr of the array of the variable Bj or not. If the determination is YES, the processing proceeds to step 244, then the corresponding relationship detection unit 14 increments the variable j by 1 in step 244, and the processing returns to step 238.

Accordingly, the processing from step 238 to step 244 is repeated until the determination in step 242 is NO. Then, the corresponding relationship information indicating a corresponding relationship between lines of the right image and the reference image is stored in the memory 28, or the like. In addition, if the determination in step 242 is YES, the corresponding relationship detection processing is terminated.

Figure 24A:
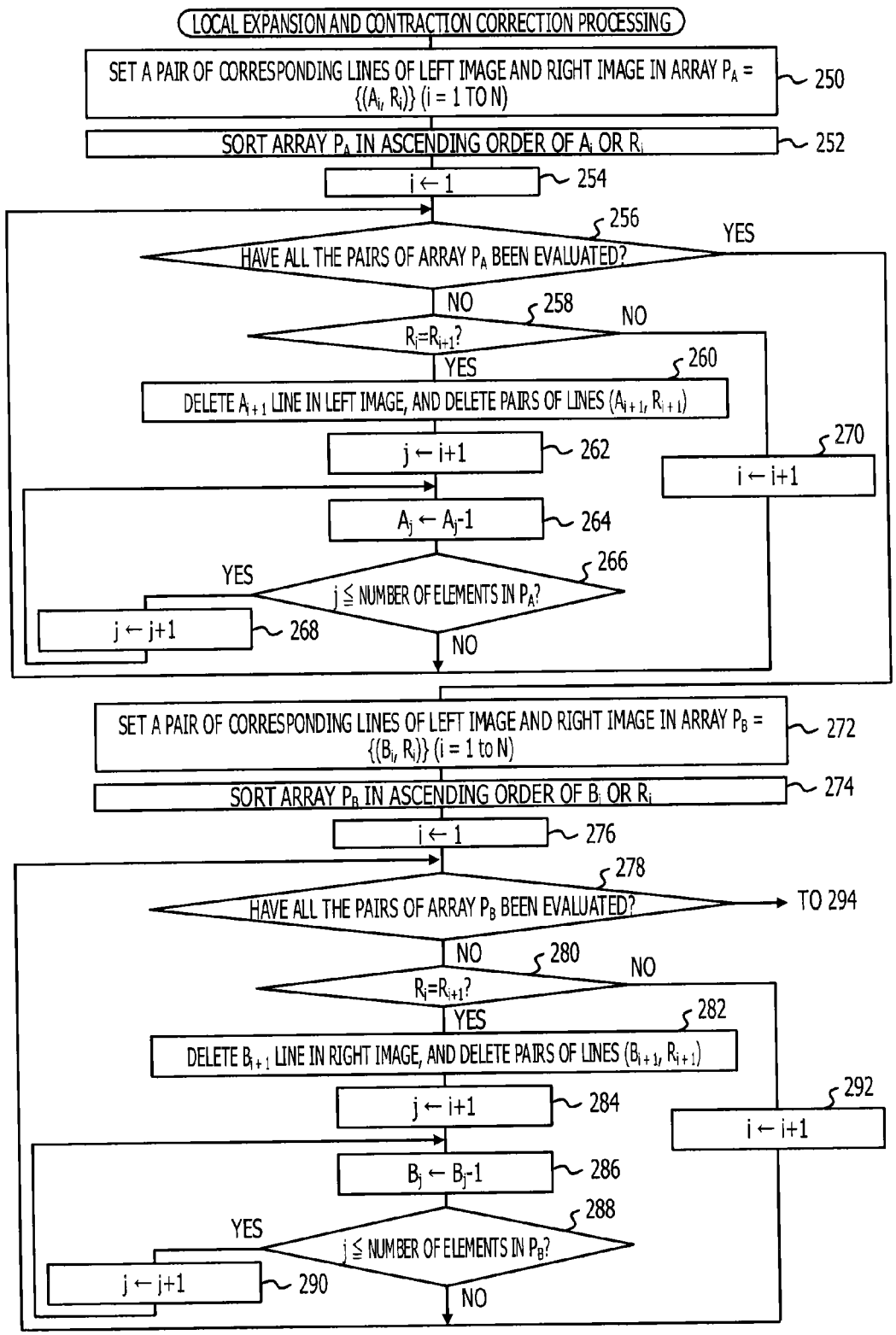

Next, the local expansion and contraction correction processing according to the third embodiment is described with reference to FIGS. 24A and 24B. In the local expansion and contraction correction processing (FIGS. 10A and 10B) described in the first embodiment, a left image and a right image are compared to perform deletion of duplicated lines and local expansion and contraction correction. On the other hand, in the local expansion and contraction correction processing according to the third embodiment, a left image and a reference image are compared to perform deletion of duplicated lines and local expansion and contraction correction. Also, a right image and a reference image are compared to perform deletion of duplicated lines and local expansion and contraction correction.

In step 250 of the local expansion and contraction correction processing, the local expansion and contraction correction unit 16 sets a pair of line numbers corresponding to the left image and the reference image indicated by the corresponding relationship information obtained by the corresponding relationship detection unit 14 in an array $P_A=\{(A_i, R_i)\}$ (i=1 to N). Further, in step 252, the local expansion and contraction correction unit 16 sorts the array $P_A$ in ascending order of the variable $A_i$ or variable $R_i$. In the subsequent processing, lines in an area extended in the left image with reference to the reference image are deleted.

First, in step 254, the local expansion and contraction correction unit 16 sets the variable i to 1. In subsequent step 256, the local expansion and contraction correction unit 16 determines whether all the pairs in the array $P_A$ have been evaluated or not. If the determination in step 256 is NO, the processing proceeds to step 258. In step 258, the local expansion and contraction correction unit 16 determines whether the value (line number) of the variable $R_i$ is equal to the value (line number) of the variable $R_{i+1}$ or not. If the determination in step 258 is NO, the processing proceeds to step 270. In step 270, the local expansion and contraction correction unit 16 increments the variable i by 1, and the processing returns to step 256.

On the other hand, if the determination in step 258 is YES, it is possible to determine that the left image is extended with respect to the reference image, and thus the processing proceeds to step 260. In step 260, the local expansion and contraction correction unit 16 deletes one line of the line number set in the variable $A_{i+1}$ in the left image, and deletes pair-of-lines $(A_{i+1}, R_{i+1})$ information from the array $P_A$.

In subsequent step 262, the local expansion and contraction correction unit 16 sets a value of 1 added to i to the variable j. Further, in step 264, the local expansion and contraction correction unit 16 decrements the line number set in the variable $A_j$ by 1. In subsequent step 266, the local expansion and contraction correction unit 16 determines whether the variable j is smaller than or equal to the number of elements in the array $P_A$. If the determination in step 266 is YES, the processing proceeds to step 268. In step 268, the local expansion and contraction correction unit 16 increments the variable j by 1, and returns to step 264. Accordingly, until the determination in step 266 is NO, processing from step 264 to step 268 is repeated.

With the deletion of one line from the left image in the preceding step 260, the line number of each line in the left image set in the array $P_A$ is moved up in step 262 to step 268. The processing from step 260 to step 268 is performed each time the determination in step 258 is YES, that is, each time an extended portion of the left image with respect to the reference image is found. Accordingly, if there are a plurality of lines in the left image that are corresponding to a same line in the reference image, the plurality of lines that are corresponding to the same line in the reference image are deleted, excluding one line in the plurality of lines, from the left image.

If the determination in step 256 is YES, the processing proceeds to step 272. In step 272, the local expansion and contraction correction unit 16 sets a pair of line numbers corresponding to the right image and the reference image indicated by the corresponding relationship information obtained by the corresponding relationship detection unit 14 in an array $P_B=\{(B_i, R_i)\}$ (i=1 to N). Further, in step 274, the local expansion and contraction correction unit 16 sorts the array $P_B$ in ascending order of the variable $B_i$ or variable $R_i$. In and after subsequent step 276, lines in an area extended in the right image with reference to the reference image are deleted.

That is, first, in step 276, the local expansion and contraction correction unit 16 sets the variable i to 1. In subsequent step 278, the local expansion and contraction correction unit 16 determines whether all the pairs in the array $P_B$ have been evaluated or not. If the determination in step 278 is NO, the processing proceeds to step 280. In step 280, the local expansion and contraction correction unit 16 determines whether the value (line number) of the variable $R_{i+1}$ is equal to the value (line number) of the variable $R_{i+1}$ or not. If the determination in step 280 is NO, the processing proceeds to step 292. In step 292, the local expansion and contraction correction unit 16 increments the variable i by 1, and the processing returns to step 278.

On the other hand, if the determination in step 280 is YES, it is possible to determine that the right image is extended with respect to the reference image, and thus the processing proceeds to step 282. In step 282, the local expansion and contraction correction unit 16 deletes one line of the line number set in the variable $B_{i+1}$ in the right image, and deletes pair-of-lines ($B_{i+1}$, $R_{i+1}$) information from the array $P_B$.

In subsequent step 284, the local expansion and contraction correction unit 16 sets a value of 1 added to i to the variable j. Further, in step 286, the local expansion and contraction correction unit 16 decrements the line number set in the variable $B_j$ by 1. In subsequent step 288, the local expansion and contraction correction unit 16 determines whether the variable j is smaller than or equal to the number of elements in the array $P_B$. If the determination in step 288 is YES, the processing proceeds to step 290. In step 290, the local expansion and contraction correction unit 16 increments the variable j by 1, and returns to step 286. Accordingly, until the determination in step 288 is NO, processing from step 286 to step 290 is repeated.

With the deletion of one line from the right image in the preceding step 282, the line number of each line in the right image set in the array $P_B$ is moved up in step 284 to step 290. The processing from step 282 to step 290 is performed each time the determination in step 280 is YES, that is, each time an extended portion of the right image with respect to the reference image is found. Accordingly, if there are a plurality of lines in the right image that are corresponding to a same line of the reference image, the plurality of lines that are corresponding to the same line in the reference image are deleted, excluding one line in the plurality of lines, from the right image.

If the determination in step 278 is YES, the processing proceeds to step 294. In step 294, the local expansion and contraction correction unit 16 sets the size (width×height) of the left image and the reference image having been subjected to the above-described processing to Wl×Hl, W×H, respectively. In and after subsequent step 296, the left image is subjected to the expansion and contraction correction using the reference image as a reference. That is, first, in step 296, the local expansion and contraction correction unit 16 prepares an image area M having a same width as the width Wl of the left image and a same height as the height H of the reference image as an image area for storing the left image after the expansion and contraction correction.

In subsequent step 298, the local expansion and contraction correction unit 16 sets the variable i to 2. In step 300, the local expansion and contraction correction unit 16 expands or contracts an image of a rectangular area having a vertex of coordinates (1, $A_{i-1}$) in the upper right corner and a vertex of coordinates (Wl, $A_{i-1}$) in the lower right corner in the left image into an image having a height ($R_i$–$R_{i-1}$) and a width Wl. This corresponds to operation of expanding or contracting the above-described rectangular area of the left image using the corresponding area size of the reference image as a reference.

In subsequent step 302, the local expansion and contraction correction unit 16 writes the rectangular area image expanded or contracted in step 300 into a rectangular area having a vertex of coordinates (1, $R_{i-1}$) in the upper right corner and a vertex of coordinates (Wl, $R_{i-1}$) in the lower right corner in the image area M. In subsequent step 304, the local expansion and contraction correction unit 16 determines whether all the pairs of the array $P_A$ have been evaluated or not. If the determination in step 304 is NO, the processing proceeds to step 306. In step 306, the local expansion and contraction correction unit 16 increments the variable i by 1, and the processing returns to step 300.

Accordingly, the processing from step 300 to step 306 is repeated until the determination in step 304 is YES. When the determination in step 304 is YES, the processing proceeds to step 308. Accordingly, local expansion or contraction is performed using the rectangular area having the vertex of coordinates (1, $A_{i-1}$) in the upper right corner and the vertex of coordinates (Wl, $A_{i-1}$) in the lower right corner of the left image as a unit so that the left image is written into the image area M in a state in which the height of the left image is matched with the height H of the reference image.

Further, in step 308, the local expansion and contraction correction unit 16 sets the size (width×height) of the right image and the reference image having been subjected to the above-described processing to Wr×Hr, W×H, respectively. In and after subsequent step 310, the right image is subjected to the expansion and contraction correction using the reference image as a reference. That is, first, in step 310, the local expansion and contraction correction unit 16 prepares an image area M having a same width as the width Wr of the right image and a same height as the height H of the reference image as an image area for storing the right image after the expansion and contraction correction.

In subsequent step 312, the local expansion and contraction correction unit 16 sets the variable i to 2. In step 314, the local expansion and contraction correction unit 16 expands or contracts an image of a rectangular area having a vertex of coordinates (1, $B_{i-1}$) in the upper right corner and a vertex of coordinates (Wr, $B_{i-1}$) in the lower right corner in the right image into an image having a height ($R_i$–$R_{i-1}$) and a width Wr. This corresponds to operation of expanding or contracting the above-described rectangular area of the right image using the corresponding area size of the reference image as a reference.

In subsequent step 316, the local expansion and contraction correction unit 16 writes the rectangular area image expanded or contracted in step 314 into a rectangular area having a vertex of coordinates (1, $R_{i-1}$) in the upper right corner and a vertex of coordinates (Wr, $R_{i-1}$) in the lower right corner in the image area M. In subsequent step 318, the local expansion and contraction correction unit 16 determines whether all the pairs of the array $P_A$ have been evaluated or not. If the determination in step 318 is NO, the processing proceeds to step 320. In step 320, the local expansion and contraction correction unit 16 increments the variable i by 1, and the processing returns to step 314.

Accordingly, the processing from step 314 to step 320 is repeated until the determination in step 318 is YES. When the determination in step 318 is YES, the local expansion and contraction correction processing is terminated. Accordingly, local expansion or contraction is performed using the rectangular area having the vertex of coordinates (1, $B_{i-1}$) in the upper right corner and the vertex of coordinates (Wr, $B_{i-1}$) in the lower right corner of the left image as a unit so that the right image is written into the image area M in a state in which the height of the right image is matched with the height H of the reference image.

In the same manner as the first embodiment, the left image and the right image having been subjected to the above-described local expansion and contraction correction processing are concatenated by the image concatenation unit 18 using the right side of the left image and the left side of the right image as a boundary into a single image, and the single image is stored in the concatenated image storage unit 20.

As described above, also in the third embodiment, corresponding relationships between lines of images to be concatenated are detected, and local expansion and contraction is corrected on the images to be concatenated on the basis of the detected corresponding relationships between the lines. Accordingly, in the case where the scanner 40 separately reads a document that is cut into sub-documents readable by the scanner 40, and thus there are a plurality of partial images having local expansion and contraction different from each other, it is possible to suppress the occurrence of misalignment over the entire length of the boundary of the partial images.

In addition, in the third embodiment, when the scanner 40 reads a document, a document transport amount is detected for each line, and a corresponding relationship between the lines of the left image, the right image, and the reference image is obtained on the basis of the detected document transport amount for each line. Accordingly, although the amount-of-transport detection sensor 65 has to be disposed, and thus the configuration of the scanner 40 may become complicated, the corresponding relationship detection processing becomes simplified, and thus load of the image processing apparatus 60 for obtaining a corresponding relationship between lines of the left image and the right image is reduced.

In this regard, in the first embodiment, a feature quantity for each line is obtained for the right side of the left image and the left side of the right image, and a corresponding relationship between lines is obtained by applying dynamic programming with fixed endpoints. However, the present disclosure is not limited to this. It is possible to apply a method other than dynamic programming in order to obtain a corresponding relationship between lines in the left image and the right image. For example, it is possible to apply a method in which the left image and the right image are displayed on a screen, and the user concatenates corresponding points between the right side of the left image and the left side of the right image by manually specifying a corresponding relationship through a GUI using a mouse, or the like.

Also, in the above, a description has been given of the case where the computer 24 that is disposed separately from the scanner 40 functions as an image processing apparatus according to the disclosed technique. However, the present disclosure is not limited to this. The scanner 40 itself may function as an image processing apparatus according to the disclosed technique.

Further, the case where the image concatenation program 42, which is an example of an image processing program according to the disclosed technique, is stored (installed) in the storage unit 30 of the computer 24 in advance has been described. However, the present disclosure is not limited to this. It is possible to provide an image processing program according to the disclosed technique in a recorded form in a recording medium, such as a CD-ROM, a DVD-ROM, or the like.

All the documents, patent applications, and technical standards described in this specification are incorporated in the same manner as the case where the individual documents, patent applications, and technical standards are described to be incorporated specifically and separately.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus, comprising:
  a processor coupled to a memory, configured to:
    detect corresponding relationships between first lines included in one of a pair of images each having different local deformation and second lines included in the other of the pair of images,
    correct the local deformation of each of the pair of images by associating each of the first lines with one of the second lines based on the corresponding relationships between the pair of images,
    concatenate the pair of images in which the local deformation is corrected using the first lines and the second lines into a single image, and
    correct the local deformation in lines of one of the pair of images when there are a plurality of lines corresponding to a same line in the other of the images by deleting, excluding one line, the plurality of lines corresponding to the same line of the other of the images based on the corresponding relationships between the lines.

2. The image processing apparatus according to claim 1, wherein
  the processor is configured to detect the corresponding relationships by calculating feature quantities of the pair of images at image ends where the pair of images are connected.

3. The image processing apparatus according to claim 1, wherein
  the processor is configured to correct the local deformation by performing processing to change, in an area defined by a first pair of adjacent lines on one of the pair of images, an interval between the first pair of lines so that the interval matches an interval between a second pair of lines in an area defined by the second pair of lines corresponding to the first pair of lines in the other of the images, based on the corresponding relationships between the lines.

4. The image processing apparatus according to claim 2, wherein
  the processor is configured to detect the corresponding relationships by comparing the calculated feature quantities in the image ends of the pair of images so as to detect corresponding relationships between the lines in the pair of images.

5. The image processing apparatus according to claim 4, wherein
  the processor is configured to detect the corresponding relationships by applying dynamic programming when comparing the calculated feature quantities at the image ends of the pair of images so as to detect corresponding relationships between the lines in the pair of images.

6. The image processing apparatus according to claim 1, wherein the pair of images each having different local deformation are images each obtained by reading a document line by line at different timing while transporting the document, and the processor is configured to detect the corresponding relationships based on an amount of transport of the document detected for each line in a period of reading the document line by line while the document is being transported.

7. The image processing apparatus according to claim 6, wherein the processor is configured to detect the corresponding relationships by comparing the amount of transport of the document detected at the time of reading individual lines of one of the pair of images with the amount of transport of the document detected at the time of reading individual lines of the other of the images, and by associating a line of the one of the images with a corresponding line having a nearest amount of transport of the document in the individual lines of the other of the images so as to detect the corresponding relationships of the individual lines.

8. The image processing apparatus according to claim 6, wherein the processor is configured to detect the corresponding relationships by comparing the amount of transport of the document detected at the time of reading individual lines of each of the pair of images with an ideal amount of transport of the document at the time of reading individual lines of the image, calculated from a resolution of reading the document, and by associating a line of the image with a line having a nearest ideal amount of transport of the document in the individual lines so as to detect the corresponding relationships of the individual lines.

9. An image processing method, comprising:

detecting, with a processor, corresponding relationships between first lines included in one of a pair of images each having different local deformation and second lines included in the other of the pair of images;

correcting the local deformation of each of the pair of images by associating each of the first lines with one of the second lines based on the corresponding relationships between the pair of images detected by the detecting; and combining the pair of images subjected to the correcting using the first lines and the second lines into a single image; wherein, in lines of one of the pair of images, when there are a plurality of lines corresponding to a same line in the other of the images, the correcting includes deleting, excluding one line, the plurality of lines corresponding to the same line of the other of the images, based on the corresponding relationships between the lines.

10. The image processing method according to claim 9, wherein, the detecting of the corresponding relationships is performed by calculating feature quantities of the pair of images at image ends where the pair of images are connected.

11. The image processing method according to claim 9, wherein the correcting includes changing, in an area defined by a first pair of adjacent lines on one of the pair of images, an interval between the first pair of lines so that the interval matches an interval between a second pair of lines in an area defined by the second pair of lines corresponding to the first pair of lines in the other of the images, based on the corresponding relationships between the lines.

12. The image processing method according to claim 10, wherein the detecting corresponding relationships comparing the calculated feature quantities in the image ends of the pair of images.

13. The image processing method according to claim 12, wherein the detecting includes applying dynamic programming when comparing the calculated feature quantities in the image ends of the pair of images.

14. The image processing method according to claim 9, wherein the pair of images each having different local deformation are images each obtained by reading a document line by line at different timing while transporting the document, and the detecting includes detecting, based on an amount of transport of the document detected for each line in a period of reading the document line by line while the document is being transported.

15. The image processing method according to claim 14, wherein the detecting includes comparing the amount of transport of the document detected at the time of reading individual lines of one of the pair of images with the amount of transport of the document detected at the time of reading individual lines of the other of the images, and associating a line of the one of the images with a corresponding line having a nearest amount of transport of the document in the individual lines of the other of the images.

16. The image processing method according to claim 14, wherein the detecting includes comparing the amount of transport of the document detected at the time of reading individual lines of each of the pair of the images with an ideal amount of transport of the document at the time of reading individual lines of the image, calculated from a resolution of reading the document, and associating a line of the image with a line having a nearest ideal amount of transport of the document in the individual lines.

17. An image processing method, comprising:

detecting corresponding relationships between first lines included in one of a pair of images each having different local deformation and second lines included in the other of the pair of images;

correcting the local deformation of each of the pair of images by associating each of the first lines with one of the second lines based on the corresponding relationships between the pair of images detected by the detecting; and combining the pair of images subjected to the correcting using the first lines and the second lines into a single image, wherein the pair of images each having different local deformation are images each obtained by reading a document line by line at different timing while transporting the document, and the detecting includes detecting, based on an amount of transport of the document detected, by an amount-oftransport detection sensor, for each line in a period of reading the document line by line while the document is being transported.

18. The image processing method according to claim 17, wherein
the amount-of-transport detection sensor irradiates the document with light, reads reflected light by an image sensor, and detects an amount of movement of the document as the amount of transport of the document.

19. The image processing method according to claim 13, wherein
the corresponding relationships are detected based on recurrence relations of the dynamic programming using a difference between the calculated feature quantities.

20. The image processing apparatus according to claim 5, wherein
the processor is configured to detect the corresponding relationships based on recurrence relations of the dynamic programming using a difference between the calculated feature quantities.

* * * * *